United States Patent [19]
Shimizume et al.

[11] Patent Number: 5,636,192
[45] Date of Patent: Jun. 3, 1997

[54] DISC PLAYER APPARATUS HAVING A SIGNAL PROCESSING CIRCUIT WHICH PRODUCES A REPRODUCTION CLOCK SYNCHRONISM WITH A REPRODUCED SIGNAL

[75] Inventors: Kazutoshi Shimizume; Mamoru Akita; Shinobu Nakamura, all of Kanagawa, Japan

[73] Assignee: Sony Corporation, Japan

[21] Appl. No.: 559,149

[22] Filed: Nov. 17, 1995

[30] Foreign Application Priority Data

Nov. 25, 1994 [JP] Japan .................................. 6-291459
Sep. 20, 1995 [JP] Japan .................................. 7-241068

[51] Int. Cl.$^6$ ........................................................ G11B 7/00
[52] U.S. Cl. ................................ 369/48; 369/47; 369/50; 360/73.03
[58] Field of Search ................................ 369/50, 47, 48, 369/43, 58; 360/73.03

[56] References Cited

U.S. PATENT DOCUMENTS 4,908,810  3/1990  Oie ............................................... 369/50
5,036,508  7/1991  Okano ........................................ 360/73.03
5,265,081  11/1993 Shimizume et al. ...................... 369/48

*Primary Examiner*—Thang V. Tran
*Attorney, Agent, or Firm*—Ronald P. Kananen

[57] ABSTRACT

A disc reproduction apparatus, configured so that a voltage-controlled oscillator is used as a device of giving a reference frequency to an analog phase-locked loop circuit, a control voltage based on a speed error of the rotational speed of a spindle with respect to the reference speed is given to this voltage-controlled oscillator by a rotational speed counting circuit, and a reference clock is produced in the analog phase-locked loop circuit based on the oscillation frequency given by this voltage-controlled oscillator and, at the same time, the reproduction clock PLLCK is produced by the digital phase-locked loop circuit based on this reference clock, whereby the operation becomes stable with respect to rotational outer disturbances and high speed access is enabled.

7 Claims, 15 Drawing Sheets

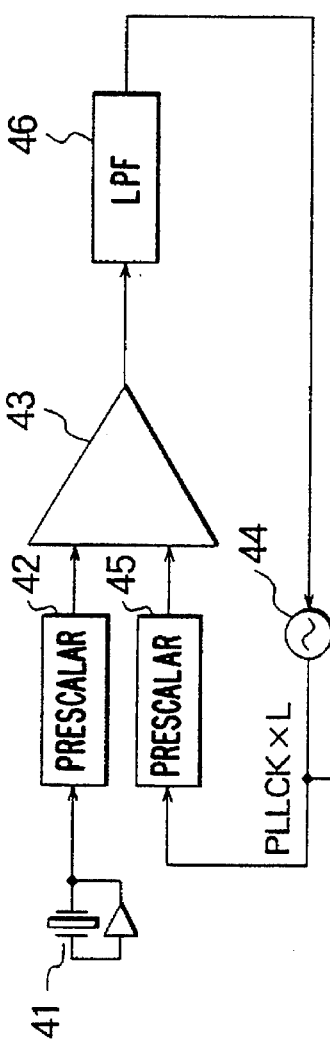
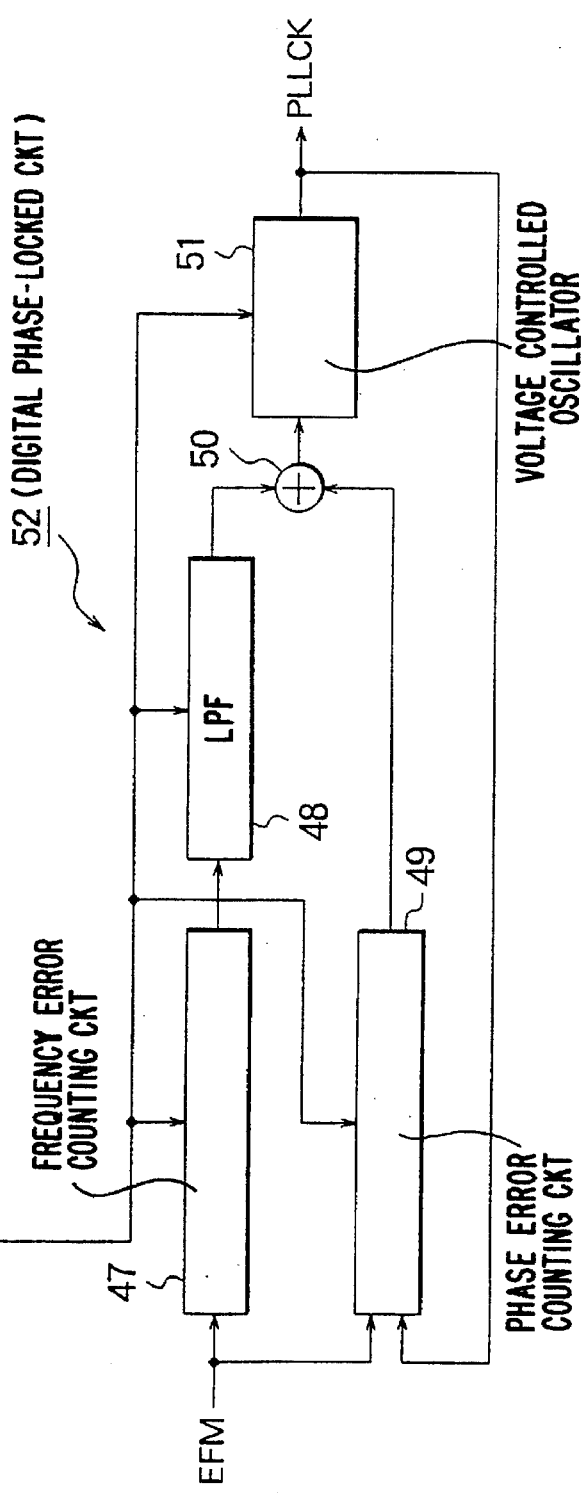
FIG. 1 (PRIOR ART)

DISC PLAYER APPARATUS HAVING A SIGNAL PROCESSING CIRCUIT WHICH PRODUCES A REPRODUCTION CLOCK SYNCHRONISM WITH A REPRODUCED SIGNAL

BACKGROUND OF THE INVENTION

1. Field of the Invention

The present invention relates to a signal processing circuit of a disc reproduction apparatus such as a disc player which plays a disc on which information is recorded (hereinafter, simply referred to as a "disc") such as a digital audio disc referred to as a "compact disc" (CD) or "mini-disc" (MD), more particularly relates to a signal processing circuit of a disc reproduction apparatus which produces a reproduction clock in synchronization with a reproduced signal from the disc and performs signal processing with respect to the reproduced signal based on this reproduction clock.

2. Description of the Related Art

In a digital audio disc, for example, a disc of a compact disc system, a modulation system referred to as "eight-to-fourteen modulation" (EFM) has been adopted. When demodulating this eight-to-fourteen signal, a clock (hereinafter, simply referred to as a reproduction clock) is produced based on a binary pulse string signal obtained by waveform-shaping an RF signal read from the disc. The demodulation is carried out by using this reproduction clock. For the production of this reproduction clock, generally a phase-locked loop (PLL) circuit has been used.

A conventional example of the phase-locked loop circuit used for the production of this reproduction clock is shown in FIG. 1. In FIG. 1, the oscillation frequency of a crystal oscillator 41 is divided by M (M being an integer) by a prescalar 42. The result becomes one input of a phase comparator 43. The phase comparator 43 receives as its other input a frequency signal obtained by frequency—dividing the oscillation frequency of a voltage-controlled oscillator (VCO) 44 by N (N being an integer) by a prescalar 45, compares the phases of the two frequency signals, and outputs a phase difference signal thereof. This phase difference signal passes through a low-pass filter (LPF) 46 and becomes the control voltage of the voltage-controlled oscillator 44. The voltage-controlled oscillator 44 changes in its oscillation frequency in accordance with this control voltage. The oscillation output of this voltage-controlled oscillator 44 is derived as the reference clock comprising a multiple of L (integer) of the reproduction clock PLLCK which is finally obtained and, at the same time, passes through the prescalar 45 and becomes the other input of the phase comparator 43.

In the above-described circuit structure, the circuit operates so that the phases of the two input signals of the phase comparator 43 coincide and, as a result, the frequencies of the two input signals coincide. Here, as one example, when assuming that the oscillation frequency of the crystal oscillator 41 is 16.9344 MHz, M=24, and N=49, the following relationship stands: Namely, from $$(PLLCK \times L)/N = 16.9344 \text{ MHz}/M$$

one obtains:

$$\begin{aligned}(PLLCK \times L)/N &= 16.9344 \text{ MHz} \times N/M \\ &= 34.5744 \text{ MHz}\end{aligned}$$

Note that if the frequency of this reproduction clock PLLCK is 4.3218 MHz, this becomes:

$$34.5744 \text{ MHz} = 4.3218 \text{ MHz} \times 8$$

Namely, L becomes equal to 8. Here, when assuming that the sampling frequency fs is the same frequency as that of the compact disc system, that is, 44.1 kHz, 16.9344 MHz becomes 384×fs. Further, 4.3218 MHz is a channel clock frequency when PWM-modulating the eight-to-fourteen signal by the compact disc system. The eight-to-fourteen signal is PWM-modulated in steps of one cycle from this 3 cycle to 11 cycle. 34.5744 MHz is a frequency 8 times that of this channel clock.

A reference clock having a frequency 8 times that of this channel clock is given to a digital phase-locked loop circuit 52. This digital phase-locked loop circuit 52 comprises a frequency error counting circuit 47, a low-pass filter 48, a phase error counting circuit 49, an adder 50, and a digital voltage-controlled oscillator 51 and has such a configuration that produces the reproduction clock PLLCK based on the reference clock and, at the same time, detects the frequency error and phase error of the eight-to-fourteen signal with respect to this reproduction clock PLLCK and controls the frequency and phase of the reproduction clock PLLCK based on that frequency error and phase error. Here, the eight-to-fourteen signal is a signal obtained by having the RF signal read from the disc waveform-shaped and digitalized. This binary signal is a signal changing at nT (wherein, n is an integer of from 3 to 11) where the cycle of the channel clock is T.

In the conventional phase-locked loop circuit of the above-described configuration, the system has been designed so that a target rotational speed of the spindle is established according to the crystal precision and, at the same time, the actual rotational speed of the spindle is counted, and a servo loop is formed bringing the difference between this and the target rotational speed to 0, while the center frequency of the phase-locked loop is set in accordance with the eight-to-fourteen signal where the spindle rotates at the target rotational speed, and the phase-locked loop is made able to be normally phase-locked within a frequency range of ±f (capture/phase-lock range) with this frequency as the center.

Here, an explanation will be made of the capture/phase-lock range of the phase-locked loop circuit based on the graph of FIG. 2. When the rotation is raised from a state where the spindle rotational speed is slower than the target rotational speed, the input frequency of the phase-locked loop is rising, and therefore the operation point moves to right in FIG. 2. When the frequency indicated by $C_-$ is reached, it suddenly phase-locks, and when the rotation is further raised, the phase-lock is held up to the $L_+$ point and when the rotation becomes faster than this, the phase-lock is released. When the rotation is lowered from this state, the characteristic is exhibited that a sudden phase-lock occurs at $C_+$, and the phase-lock is held up to $L_-$, This frequency range from $L_-$ to $L_+$ is referred to as the "phase-lock range" and is determined by the gain possessed by the phase-locked loop. On the other hand, the frequency range from $C_-$ to $C_+$ is referred to as the "capture range" and always becomes narrower than the phase-lock range. The wider this capture/phase-lock range ±f, the better, but in a conventional phase-locked loop circuit, there was a frequency displacement of about 5 percent. This was because, for example, in the signal of 11 T and 10 T, where an eight-to-fourteen signal of 10.5 T which is deviated by 5 percent is input, it becomes impossible to correctly determine whether the period of 10 T becomes longer or the period of 11 T becomes shorter.

As mentioned above, in a conventional phase-locked loop circuit, the rotational speed of the spindle is constantly controlled so as to become the target speed. When it is set at this speed, the phase-locked loop may be phase-locked to enable the data to be normally reproduced. Note, since the actual rotational speed of the spindle deviates from the target value, to make up for this amount of deviation, as mentioned above, a certain degree of a capture/phase-lock range ±f of the phase-locked loop had become necessary.

However, for example, in a state where a compact disc player is used outdoors, where the player unit is rotated in the direction of rotation of the disc or in a direction opposite to the rotation thereof, the relative speed with respect to the pick-up deviates to a large extent due to the inertia of the spindle, whereby the rotational speed of the spindle deviates by a large extent from the target speed and the signal is no longer within the capture/phase-lock range ±f. Therefore, there were the problems that the player was susceptible to rotational outer disturbances, for example, the phase-lock of the phase-locked loop was released and the music ceased, and was poor in high speed access.

SUMMARY OF THE INVENTION

An object of the present invention is to provide a disc reproduction apparatus which is resistant against rotational outer disturbances and excellent in high speed access.

So as to achieve the above-described object, according to a first aspect of the present invention, there is provided a signal processing circuit of a disc reproduction apparatus which produces a reproduction clock in synchronization with a reproduced signal from a disc and performs signal processing with respect to the aforesaid reproduced signal based on this reproduction clock and which is provided with a rotational speed counting means for detecting a rotational speed of a spindle based on the aforesaid reproduced signal and produces a control signal in accordance with a speed error with respect to a reference speed; an oscillation means whose oscillation frequency changes in accordance with the aforesaid control signal; a first phase-locked loop circuit which produces a reference clock of a predetermined frequency based on the oscillation frequency of the aforesaid oscillation means; and a second phase-locked loop circuit which produces the aforesaid reproduction clock based on the aforesaid reference clock, detects the frequency error and phase error of the aforesaid reproduced signal with respect to this reproduction clock, and controls the frequency and phase of the aforesaid reproduction clock based on that frequency error and phase error.

According to a second aspect of the present invention, there is provided a disc reproduction apparatus which produces a reproduction clock in synchronization with a reproduced signal from a disc and performs signal processing with respect to the aforesaid reproduced signal based on this reproduction clock and which is provided with a rotational speed counting means for detecting a rotational speed of a spindle based on the aforesaid reproduced signal and produces a control signal in accordance with a speed error with respect to a reference speed; a filter means whose cut-off frequency is variable in accordance with a changeover control signal and which extracts only a predetermined frequency range of the aforesaid control signal by a related cut-off frequency and outputs the same; an oscillation means whose oscillation frequency changes in accordance with a control signal output from the aforesaid filter means; a first phase-locked loop circuit which generates a reference clock of a predetermined frequency based on the oscillation frequency of the aforesaid oscillation means; a second phase-locked loop circuit which generates the aforesaid reproduction clock based on the aforesaid reference clock, detects the frequency error and phase error of the aforesaid reproduced signal with respect to this reproduction clock, and controls the frequency and phase of the aforesaid reproduction clock based on that frequency error and phase error; an acceleration detection means for receiving the aforesaid oscillation output and reference clock and detecting the roll acceleration; and a control means for outputting to the aforesaid filter means the aforesaid changeover control signal in accordance with a result of a comparison between the aforesaid detected acceleration and a preliminarily set acceleration.

According to a third aspect of the present invention, there is provided a disc reproduction apparatus which is provided with a speed control signal production means for receiving a reproduced signal from a disc, detecting a speed error with respect to a target rotational speed of a rotational speed of the disc, and outputting a speed control signal in accordance with this speed error; a filter means whose cut-off frequency is variable in accordance with a changeover control signal and which extracts only a predetermined frequency range of the aforesaid speed control signal by a related cut-off frequency and outputs the same; an oscillation means whose oscillation output changes in accordance with the speed control signal output from the aforesaid filter means and which supplies that oscillation output as the system clock to the aforesaid speed control signal production means; a speed control means for detecting a phase difference of the aforesaid oscillation output with respect to the reference clock and controlling the rotational speed of the disc in accordance with that phase difference; an acceleration detection means for receiving the aforesaid oscillation output and reference clock and detecting the roll acceleration; and a control means for outputting to the aforesaid filter means the aforesaid changeover control signal in accordance with a result of comparison between the aforesaid detected acceleration and a preliminarily set acceleration.

According to a fourth aspect of the present invention, there is provided a disc reproduction apparatus which is provided with a speed control signal production means for receiving a reproduced signal from a disc, detecting a speed error with respect to a target rotational speed of a rotational speed of the disc, and outputting a speed control signal in accordance with this speed error; an oscillation means whose oscillation output changes in accordance with the aforesaid speed control signal; a speed control means for detecting a phase difference of the aforesaid oscillation output with respect to a reference clock and controlling the rotational speed of the disc in accordance with that phase difference; a selection means for selecting either one of the aforesaid oscillation output and the aforesaid reference clock in accordance with a changeover control signal and supplying the same as the system clock to the aforesaid signal processing means; an acceleration detection means for receiving the aforesaid oscillation output and reference clock and detecting the roll acceleration; and a control means which outputs to the aforesaid selection means the aforesaid changeover control signal in accordance with a result of comparison between the aforesaid detected acceleration and a preliminarily set acceleration.

According to the signal processing circuit of the present invention, the rotational speed counting means detects the rotational speed of a spindle based on the reproduced signal from the disc and gives a signal that brings the speed error with respect to the reference speed to zero to the oscillation means, for example, a VCO, as the control voltage thereof. By this, the voltage-controlled oscillator changes in its oscillation frequency in proportion to the rotational speed of the spindle. This oscillation frequency of the voltage-controlled oscillator becomes the reference frequency of the first phase-locked loop circuit. The first phase-locked loop circuit produces the reference clock based on this reference frequency, and the second phase-locked loop circuit produces the reproduction clock while performing the control of the frequency and phase based on this reference clock.

Also, according to the signal processing circuit of the present invention, the acceleration detection means detects the change of the rotational speed of the disc, that is, the acceleration, and the control means produces a changeover control signal that makes the cut-off frequency of the filter means, for example, an LPF, high where the detected acceleration is larger than the set acceleration and makes the cut-off frequency of the aforesaid filter means low where the detected acceleration is smaller than the set acceleration. By this, the optimum cut-off frequency of the filter can be set in all reproduction states.

Also, according to the signal processing circuit of the present invention, the acceleration detection means detects the change of the rotational speed of the disc, that is, the acceleration, and the control means produces a changeover control signal for selecting the reference clock where the detected acceleration is smaller than the set acceleration and selecting an oscillation output where the detected acceleration is larger than the set acceleration. By this, music etc. can be continuously reproduced even if a strong outer disturbance is applied.

BRIEF DESCRIPTION OF THE DRAWINGS

These and other objects and features of the present invention will become more apparent from the following description of the preferred embodiments made with reference to the attached drawings, wherein:

FIG. 1 is a block diagram of a compact disc player according to the related art;

DESCRIPTION OF THE PREFERRED EMBODIMENTS

Figure 2:
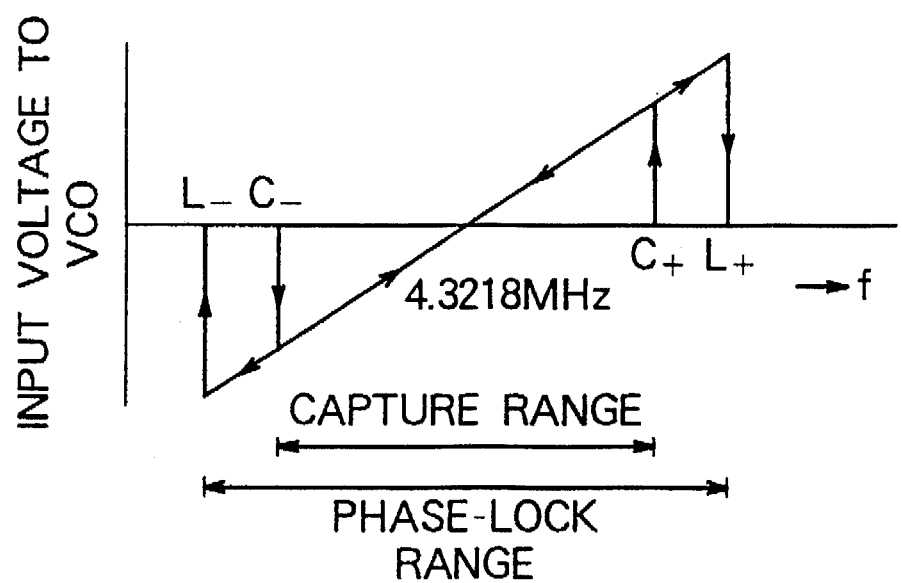
FIG. 2 is a graph of a phase-locked loop circuit used for the compact disc player shown in FIG. 1.

Below, a detailed explanation will be made of the preferred embodiments of the present invention as applied to for example a compact disc player by referring to the drawings. Note that the present invention is not restricted to application to a compact disc player and can be applied to all disc players such as an MD player.

Figure 3:
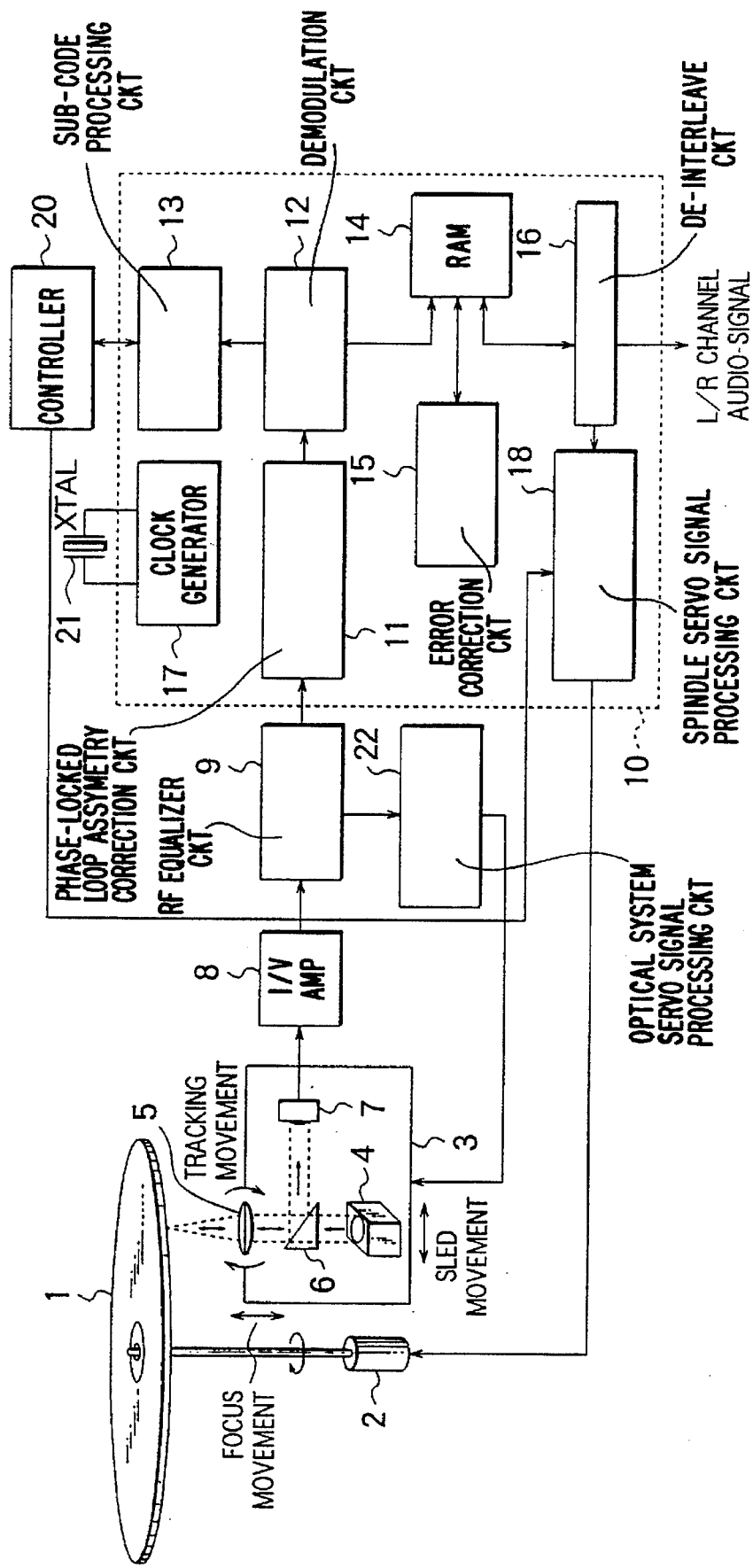
FIG. 3 is a view of the configuration of a control system of a compact disc player according to a first embodiment of the present invention.

FIG. 3 is a view of the configuration showing a first embodiment of a control system of the compact disc player to which the present invention is applied.

In FIG. 3, a disc (CD) 1 is driven to rotate by a spindle motor 2. The information recorded thereof is read by an optical pick-up (hereinafter, simply referred to as a "pick-up") 3. The pick-up 3 is constituted by a laser diode 4, an objective lens 5 which converges the laser light beam emitted from this laser diode 4 onto the signal recording surface of the disc 1 as an information reading optical spot, a polarized beam splitter 6 which changes the direction of progression of the light beam reflected from the disc 1, a photo-detector 7 for receiving this reflected light beam, etc. and is provided to be movable in the radial direction of the disc by using a thread feed motor (not illustrated) as the driving source.

In the pick-up 3, although not illustrated, there are housed a tracking actuator which moves the information reading optical spot in the radial direction of the disc with respect to the recording track of the disc 1 and a focus actuator moving the same in the direction of the light axis of the objective lens 5. The output signal of this pick-up 3 is converted from a current signal to a voltage signal at an I (current)/V (voltage) amplifier 8 which is then further waveform-shaped by an RF equalizer circuit 9 and then supplied to a digital signal processor (DSP) circuit 10.

Next, an explanation will be made of the signal processing in this digital signal processor circuit 10. First, the asymmetry is corrected at the phase-locked loop asymmetry correction circuit 11, and a binary eight-to-fourteen signal is obtained. Here, "asymmetry" means a state where the center of the eye pattern of the RF signal is deviated from the center of the amplitude. The phase-locked loop asymmetry correction circuit 11 includes a phase-locked loop circuit producing the reproduction clock PLLCK based on the binary signal edge. The detailed configuration of this phase-locked loop circuit will be explained later.

Next, in the eight-to-fourteen demodulation circuit 12, the eight-to-fourteen signal is demodulated to give the digital audio data and the error correcting and detecting parity. At the same time, a sub-code placed immediately behind the free synchronization signal is demodulated. This sub-code is supplied to a controller 20 through a sub-code processing circuit 13. The controller 20 is constituted by a CPU. The data after the eight-to-fourteen demodulation is stored once in the RAM 14, then error correction is carried out by an error correction circuit 15 based on the error correcting and detecting parity. The data after the error correction is output as the L/R ch audio signal after the interleave of the cross interleave Reed-Solomon code (CIRC) is released at the deinterleave circuit 16.

The digital signal processor circuit 10 is further provided with a spindle servo signal processing circuit 18 for controlling the rotation of the spindle motor 2. The digital signal processor circuit 10 includes a clock generator 17 for generating various types of clocks based on the high precision oscillation output of the crystal oscillator 21 and performs various types of signal processing based on the respective clocks.

Note that, the optical system servo signal processing circuit 22 is for controlling the respective servo systems in relation to the operation of the pick-up 3, that is, a tracking servo system for making the information reading light spot follow the recording track of the disc 1, a focus servo system for converging the related light spot onto the signal recording surface of the disc 1 at all times, and a thread servo system for performing positional control in the radial direction of the disc of the pick-up 3.

Next, an explanation will be made of a phase-locked loop circuit, which is the characterizing part of the present invention, included in the phase-locked loop asymmetry correction circuit 11.

Figure 4:
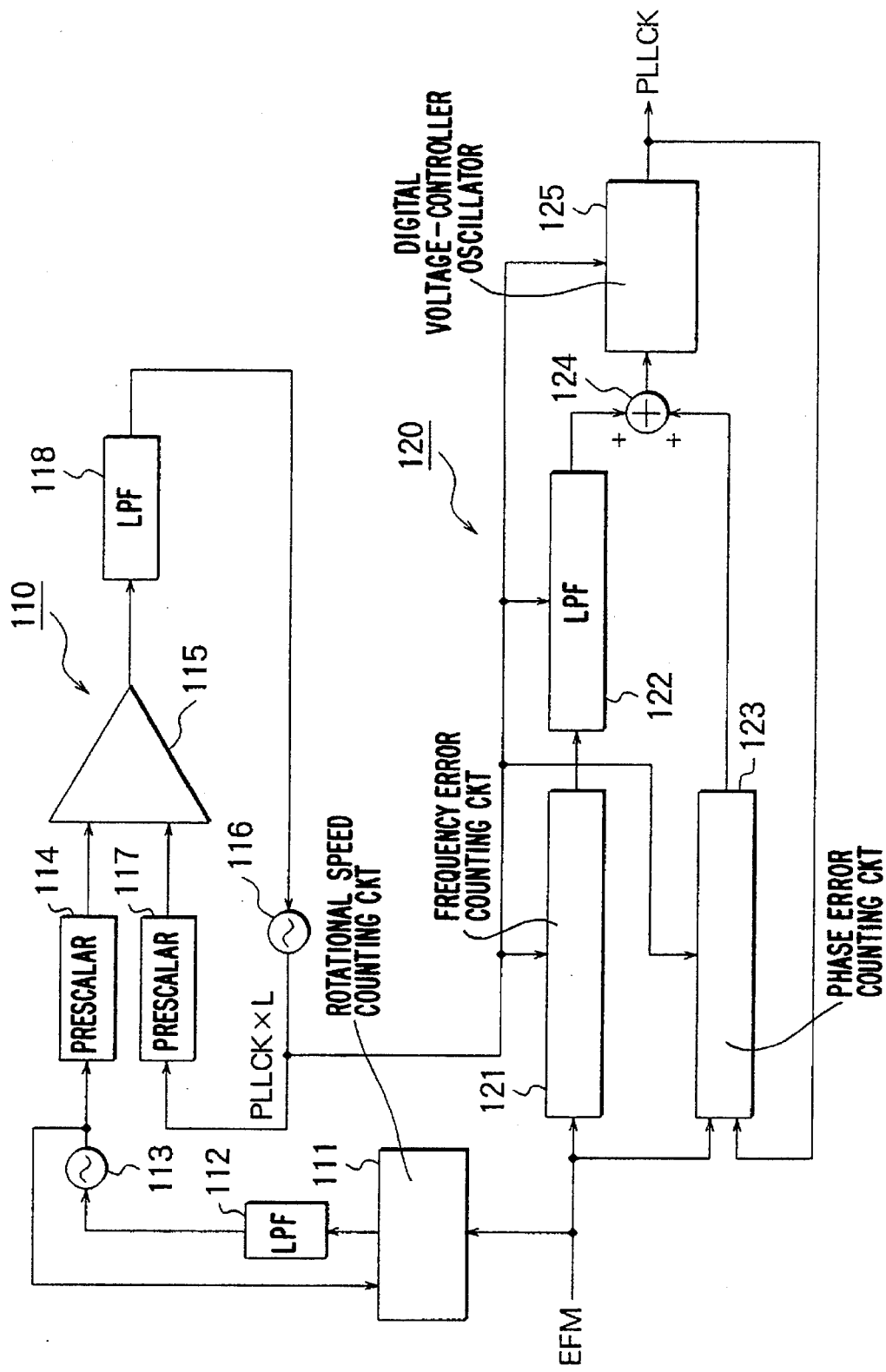
FIG. 4 is a block diagram showing an example of a phase-locked loop asymmetry correction circuit according to the compact disc player shown in FIG. 3.

FIG. 4 is a circuit diagram showing one example of the configuration of this phase-locked loop circuit.

In FIG. 4, a rotational speed counting circuit 111 detects the rotational speed of the spindle motor 2 (hereinafter, simply referred to as the "spindle") based on the eight-to-fourteen signal and produces a control signal bringing the speed error with respect to the reference speed 0. The detailed circuit configuration thereof will be explained later. This control signal is supplied to a voltage-controlled oscillator 113 as the control voltage thereof after the high frequency component is cut by a low-pass filter 112. The oscillation frequency of the voltage-controlled oscillator 113 is divided by M (M being an integer) by a prescalar 114. The result becomes one input of a phase comparator 115.

The phase comparator 115 receives as its other input the frequency signal obtained by dividing the oscillation frequency of a voltage-controlled oscillator 116 by N (N being an integer) by a prescalar 117, compares the phases of the two frequency signals, and output the phase difference signal thereof. This phase difference signal has its high frequency component cut off at the low-pass filter 118 and is supplied to the voltage-controlled oscillator 116 as its control voltage. The oscillation frequency of this voltage-controlled oscillator 116 is derived as a reference clock comprised of a multiple of L (L being an integer) of the reproduction clock PLLCK to be finally obtained and, at the same time, becomes the other input of the phase comparator 115 through the prescalar 117. From the above, an analog phase-locked loop circuit (first phase-locked loop circuit) 110 producing a reference clock is constituted.

The frequency of the reference clock is 35.5744 MHz as mentioned previously and is a frequency 8 times (L=8) that of the channel clock. This reference clock is given to the digital phase-locked loop circuit (second phase-locked loop circuit) 120 comprising a frequency error counting circuit 121, a low-pass filter 122, a phase error counting circuit 123, an adder 124, and a digital voltage-controlled oscillator 125. In this digital phase-locked loop circuit 120, the eight-to-fourteen signal which is input to the frequency error counting circuit 121 and the phase error counting circuit 123 is a binary signal changing at nT (more precisely, n is an integer of from 3 to 11) if the period of the channel clock is T.

That is, if the time from one changing point to the next changing point of the eight-to-fourteen signal coincides with nT, it can be said that the frequency error of the eight-to-fourteen signal at this time is 0. In other words, it means that the spindle, whose rotational speed determines the cycle of the eight-to-fourteen signal, is rotating at the target rotational speed. Here, if the rotational speed of the spindle is a rotational speed slower than the target rotational speed by 10 percent, the signal of 3 T of the eight-to-fourteen signal becomes 3.3 T, and the signal of 4 T becomes 4.4 T. The frequency error counting circuit 121 is configured to divide this reference clock to ⅛ to form a period T of the target value and counts how much the changing point of the eight-to-fourteen deviates from the point obtained by multiplying the same by a certain integer (3 to 11), thereby to count the frequency error of the eight-to-fourteen signal.

The frequency error of the eight-to-fourteen signal counted by this frequency error counting circuit 121 has its high frequency component cut off at the low-pass filter 122 in the next stage and thereby becomes the real amount of frequency deviation. The information of this amount of frequency deviation is given via the adder 124 to the digital voltage-controlled oscillator 125. The digital voltage-controlled oscillator 125 divides the reference clock usually by 8 and is configured so that, where the information of the amount of frequency deviation which was input is information indicating to raise the frequency, the number by which to divide the frequency is made smaller and the oscillation frequency thereof is raised. Conversely, where it is information indicating to lower the frequency, the number by which to divide the frequency is made larger and the oscillation frequency is lowered.

The frequency signal of this digital voltage-controlled oscillator 125 is derived as the reproduction clock PLLCK. This reproduction clock PLLCK is controlled so that the frequency is deviated by the same ratio as the deviation of the eight-to-fourteen signal from the reference frequency and coincides with the frequency of T included in the eight-to-fourteen signal. Also, the reproduction clock PLLCK is fed back to the phase error counting circuit 123. The phase error counting circuit 123 counts the phase difference between the eight-to-fourteen signal and the reproduction clock PLLCK and gives a control voltage in accordance with that phase difference to the digital voltage-controlled oscillator 125 via the adder 124, thereby to exercise control to bring the phase difference between the eight-to-fourteen signal and the reproduction clock PLLCK to 0.

As mentioned above, by using as the oscillator generating the reference frequency of the analog phase-locked loop circuit 110 the voltage-controlled oscillator 113 and by detecting the rotational speed of the eight-to-fourteen signal by the rotational speed counting circuit 111 and giving a control voltage bringing the speed error with respect to the reference speed to the voltage-controlled oscillator 113, both of the voltage-controlled oscillator 113 and voltage-controlled oscillator 116 change in their oscillation frequencies in proportion to the rotational speed of the spindle. For example, when the rotational speed of the spindle is the reference rotational speed, the oscillation frequency of the voltage-controlled oscillator 113 is 16.9344 MHz, and the oscillation frequency of the voltage-controlled oscillator 116 becomes 34.5744 MHz.

When now assuming that the rotational speed of the spindle is slower than the reference rotational speed by x percent, both of the voltage-controlled oscillator 113 and voltage-controlled oscillator 116 come to have an oscillation frequency lower by x percent. Along with this, the digital phase-locked loop circuit 120 has a capture/phase-lock range of ±f with the frequency lower by x percent as the center. As a result, as the entire system, a phase-locked loop circuit which enables tracking in a very wide range can be formed. By this, contrary to the conventional phase-locked loop circuit wherein the capture/phase-lock range was about 5 percent in terms by the frequency displacement, according to the phase-locked loop circuit of the present embodiment, a sufficient phase-lock can be established even with a speed displacement of several hundreds of percent.

Figure 5:
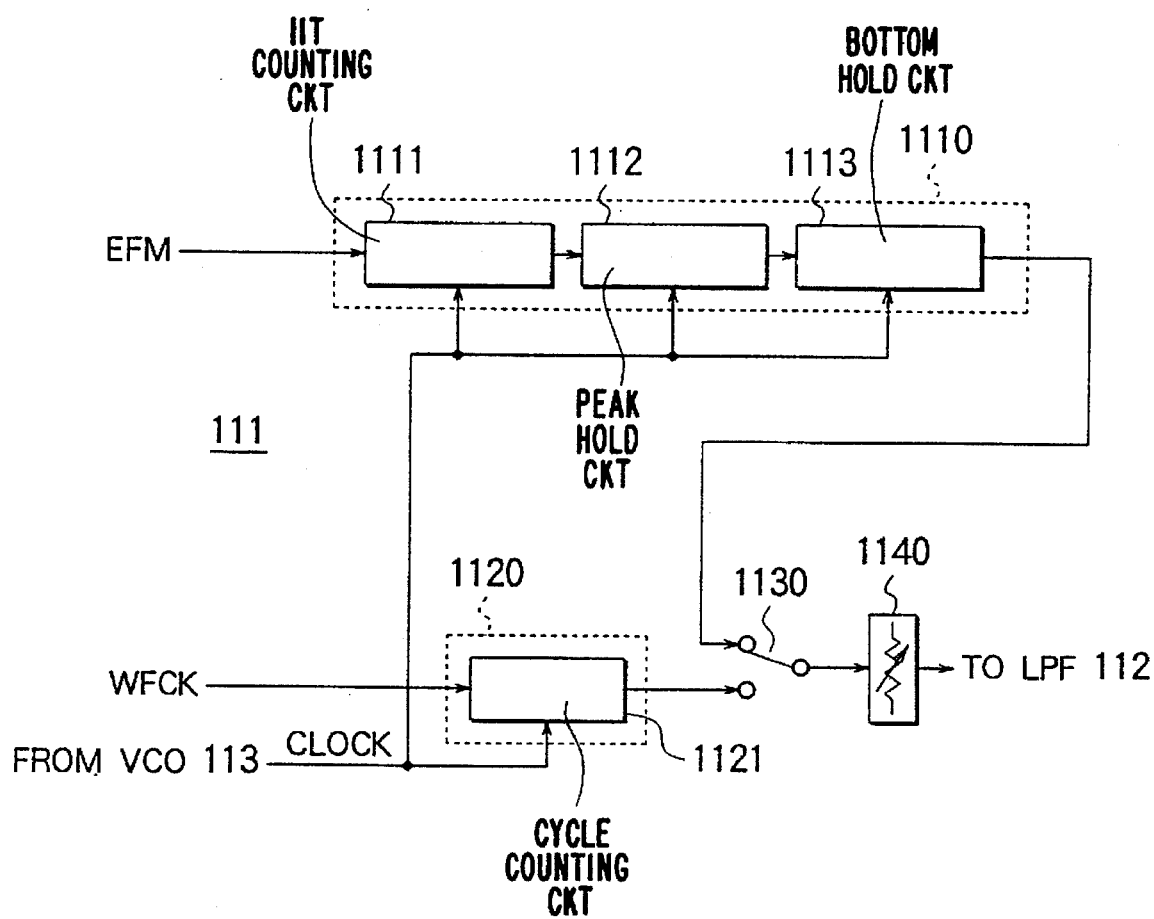
FIG. 5 is a block diagram showing one example of a rotational speed counting circuit according to the compact disc player shown in FIG. 3.

FIG. 5 is a block diagram showing a detailed example of the circuit configuration of the rotational speed counting circuit 111.

As shown in FIG. 5, the rotational speed counting circuit 111 is constituted by a rough servo (pull-in servo) circuit 1110 which pulls in the rotational speed of the spindle to a certain degree of precision, a speed servo circuit 1120 performing control with a high precision after the pull-in by this rough servo circuit 1110, a servo changeover switch 1130, and a gain set circuit 1140.

In the rough servo circuit 1110, first, in the 11 T counting circuit 1111, the counting of the cycle of the part corresponding to the frame synchronization in the eight-to-fourteen signal, which is the signal reproduced from the disc 1, is based on the clock which is supplied from the voltage-controlled oscillator 113 of FIG. 3.

By this, the minimum frequency signal 11 T in the disc 1 can be detected. Then, processing for holding the peak value in the predetermined period Ta by the peak hold circuit 1112 based on this signal 11 T and, further, for holding the bottom value of this held peak value in a period Tb larger than the period Ta by the bottom hold circuit 1113 is carried out, whereby the reproduced frame synchronization signal is detected. The detection of the reproduced frame synchronization signal by this peak hold and bottom hold is a well known technology disclosed in for example Japanese Examined Patent Publication No. 1-35419. According to this, an original reproduced frame synchronization signal can be reliably detected while eliminating influences such as noise due to the drop out.

This reproduced frame synchronization signal passes through the servo changeover switch 1130 and is set in its gain in the gain set circuit 1140, and then passes through the low-pass filter 112 of FIG. 4 to become the control voltage of the voltage-controlled oscillator 113. By this, a speed control loop is formed by the rough servo circuit 1110, and the oscillation frequency of the voltage-controlled oscillator 113 is set to a frequency that is determined to be just 11 T with respect to the signal 11 T no matter what the rotational speed which the spindle rotates at. As a result, the phase-locked loop circuit of FIG. 2 is phase-locked, and therefore it becomes possible to reproduce information from the disc 1. A reproduction clock WFCK having the same cycle as this is produced in a non illustrated circuit based on the reproduced frame synchronization signal.

At this point of time, the servo changeover switch 1130 is switched from the rough servo circuit 1110 side to the speed servo circuit 1120 side. The speed servo circuit 1120 is constituted by a cycle counting circuit 1121 which counts the cycle of the reproduction clock WFCK based on the clock supplied from the voltage-controlled oscillator 113 of FIG. 4. This cycle counting circuit 1121 counts the cycle of the reproduction clock WFCK and outputs the difference with respect to the cycle of the reference frequency 7.35 kHz as the speed error. This speed error passes through the servo changeover switch 1130, is set in gain at the gain set circuit 1140, and then becomes the control voltage of the voltage-controlled oscillator 113 via the low-pass filter 112 of FIG. 4. By this, a speed control loop with a high precision is formed, and the oscillation frequency of the voltage-controlled oscillator 113 is determined in proportion to the rotational speed of the spindle.

As explained above, according to the first embodiment of the invention, the configuration is made so that the voltage-controlled oscillator 113 is used as a means of giving a reference frequency to the analog phase-locked loop circuit 110 (first phase-locked loop circuit). A control voltage based on the speed error with respect to the reference speed of the rotational speed of spindle is given to this voltage-controlled oscillator 113. The reference clock PLLCK×L is produced in the first phase-locked loop circuit based on the oscillation frequency given by this voltage-controlled oscillator 113 and, at the same time, the reproduction clock PLLCK is produced at the digital phase-locked loop circuit 120 (second phase-locked loop circuit) based on this reference clock. Therefore, the oscillation frequency changes in proportion to the rotational speed of the spindle in both of the above-described voltage-controlled oscillator 113 and voltage-controlled oscillator 116 in the first phase-locked loop circuit, and thus a phase-locked loop circuit having a very wide capture/phase-lock range can be realized as the overall system.

As a result, for example, where the disc player is being used outdoors, even in a case where the rotational speed of the spindle greatly deviates with respect to the target value, for example, a case where the player unit is rotated in the direction of rotation or the direction opposite to the direction of rotation of the disc or a case where a big track jump occurs at the time of access, the locking of the phase-locked loop is almost never released, and therefore the data can be always read and, at the same time, high speed access becomes possible. In other words, this means that there is no problem even if the spindle servo control is relatively loose and means that the servo gain can be lowered. Accordingly, it becomes possible to keep the power consumption of the spindle servo circuit low.

Figure 6:
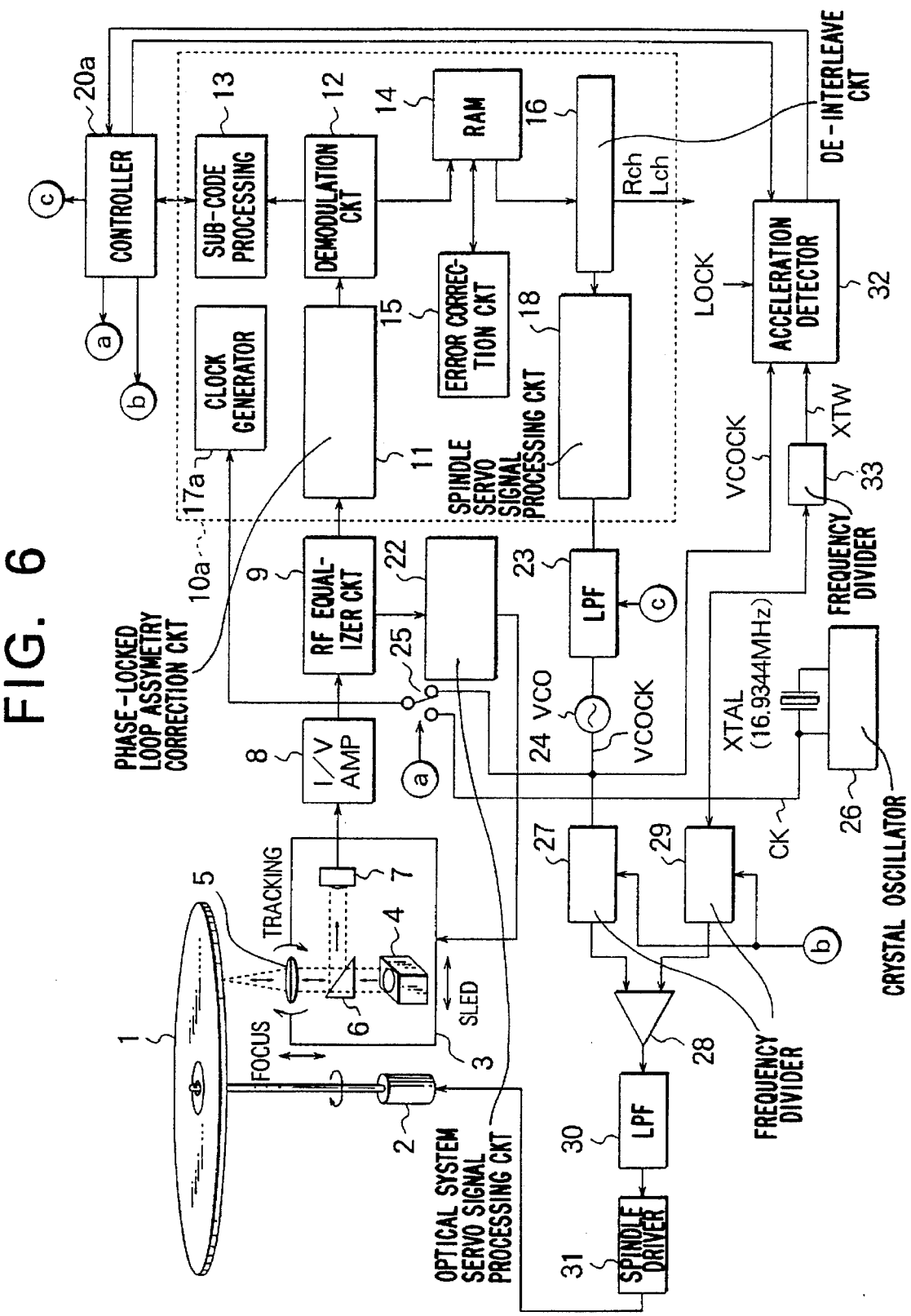
FIG. 6 is a view of the configuration showing a control system of a compact disc player according to a second embodiment of the present invention.

FIG. 6 is a view of the configuration showing a second embodiment of the control system of a compact disc player to which the present invention is applied, in which the same constituent parts as those Of FIG. 1 showing the first embodiment are represented by the same references.

Namely, 1 denotes a disc; 2, a spindle; 3, a laser diode 4; 4, an objective lens; 5, a polarized beam splitter; 6, a pick-up having a photo-detector 7; 8, an I/V amplifier; 9, an RF equalizer; 10a, a phase-locked loop asymmetry correction circuit; 11, an eight-to-fourteen demodulation circuit; 12, a sub-code processing circuit; 13, a RAM; 14, an error correcting circuit; 15, a de-interleave circuit; 16, a clock generator; 17a, a digital signal processor circuit comprising a spindle servo signal processing circuit 18; 20a, a controller; and an optical system servo signal processing circuit 22, respectively.

In the present embodiment, the servo error signal from the spindle servo signal processing circuit 18 is supplied via the low-pass filter (LPF) 23 to the voltage-controlled oscillator (VCO) 24 as the control signal thereof. The oscillation output VCPCK of this voltage-controlled oscillator 24 becomes one input of the changeover switch 25.

The changeover switch 25 receives as its other input the fixed clock of for example 16.9344 MHz (44.1 kHz×384) generated by the crystal oscillator 26 and is controlled in switching by the controller 20a, thereby to select either of the oscillation output VCOCK of the voltage-controlled oscillator 24 and the fixed clock of 16.9344 MHz, and supplies the same to the clock generator 17.

The clock generator 17a produces a system clock of a fixed frequency when the fixed clock of the crystal oscillator 26 is supplied, while produces a system clock of a frequency variable in accordance with the oscillation output VCOCK when the oscillation output VCOCK of the voltage-controlled oscillator 24 is supplied.

Also, the oscillation output VCOCK of the voltage-controlled oscillator 24 is divided by M by the 1/M frequency divider 27 to give one input of the phase comparator 28. Also, the fixed clock of the crystal oscillator 26 is divided by N at the 1/M frequency divider 29 and becomes the other input of the phase comparator 28.

Note that, both of M and N are variables which can be made any values and are set to appropriate values by the controller 20a.

The phase comparator 28 detects the phase difference between the divided output of the 1/M frequency divider 27 and the divided output of the 1/N frequency divider 29 and outputs a phase difference signal in accordance with this phase difference.

This phase difference signal is supplied to a spindle driver 31 as the drive signal of the spindle 2 via the low-pass filter 30.

In the above-described configuration, when the changeover switch 25 selects the fixed clock of the crystal oscillator 26, the system clock is fixed to 16.9344 MHz.

On the other hand, when the changeover switch 25 selects the oscillation output VCOCK of the voltage-controlled oscillator 24, the system clock changes so that the servo error signal output from the spindle servo signal processing circuit 18 becomes 0. Namely, even if the rotational speed of the disc 1 is relatively loose, the system clock changes following the rotational speed thereof.

Further, the oscillation output VCOCK of the voltage-controlled oscillator 24 is supplied to the acceleration detector 32. To the acceleration detector 32, a signal XTW obtained by dividing the frequency of the output clock of the crystal oscillator 26 by L, for example, subjected to frequency division to ⅛, and the signal LOCK produced in a non illustrated frame sync protection circuit are supplied.

The acceleration detector 32 detects the acceleration based on the input signal VCOCK and XTW, produces a signal SCF for the changeover of the cut-off frequency of the low-pass filter 23 based on the detected acceleration, the set acceleration which is preliminarily given from the controller 20a, and the signal LOCK and outputs the same to the controller 20a.

Then, the controller 20a performs control so as to make the cut-off frequency of the low-pass filter 23 high where for example the detected acceleration is larger than the set acceleration so as to follow the change of speed thereof and to make the cut-off frequency of the low-pass filter 23 low where the detected acceleration is smaller than the set acceleration.

Below, a further detailed explanation will be made of the principle, configuration, and function of a signal processing circuit provided with this acceleration detection system while referring to the drawings.

As the low-pass filter 23 of the front voltage-controlled oscillator 24 in FIG. 6, a filter having a very low noise is desired. That is, where noise is included in this filter output, the voltage-controlled oscillator reacts with the noise potential thereof, and the CN ratio of the oscillation frequency is degraded. For this reason, the CNR of the phase-locked loop is also degraded, and consequently the playability is deteriorated. For example, the error rate of the reproduced data becomes large.

So as to solve this, verification of the noise component is necessary. For this, it is necessary to lower the cut-off frequency of the low-pass filter 23 as much as possible (for example 1 Hz or less). However, where the cut-off is made low, there is a problem in that when the rotational speed of the spindle 2 changes by a large amount, the change cannot be tracked with an low-pass filter having a large time constant.

That is, the oscillation frequency of the voltage-controlled oscillator cannot change fast enough to follow the change of the rotational speed. When the frequency difference thereof exceeds the capture range of the PLL, the locking of the phase-locked loop is released. When it can be anticipated that the rotational speed of the spindle 2 will change by a large extent, it is possible to change over the cut-off frequency of the low-pass filter by control by a microcomputer, but where the change cannot be expected, the cut-off frequency cannot be changed.

The second embodiment provides a signal processing circuit based on the detection of acceleration as a means of automatically changing over the cut-off frequency of the low-pass filter so that the phase-lock is not released in all circumstances and selecting the optimum cut-off frequency with respect to the change of the rotational speed. Of course, in this case, a slight degradation of the playability cannot be avoided, but in comparison with a case where the phase-lock of the phase-locked loop is released and it becomes impossible to read any data, this is considerably better.

In FIG. 6, the voltage-controlled oscillator 24 changes in its oscillation frequency in proportion to the linear speed of the spindle 2. That is, by counting this frequency, the linear speed can be determined. Further, if the difference of this linear speed is counted at predetermined intervals, this is a difference of speed and acceleration. Where the spindle rotates at a constant linear speed, the acceleration is generally zero.

However, where an outer disturbance occurs or a big track jump is carried out, the linear speed changes by a large extent. Where the acceleration at this time is always counted and it becomes more than a certain reference, a signal for raising the cut-off frequency of filter is produced. By performing this, at least unlocking of the phase-locked loop can be prevented.

Note that the proportional relationship between the oscillation frequency of the voltage-controlled oscillator and the spindle linear speed stands only in a case where the phase-locked loop is phase-locked. For example, where the eight-to-fourteen signal cannot be correctly obtained, for example, during a transverse, the linear speed of the spindle cannot be predicted from the oscillation frequency of the VCO. In such a case, it can be determined that the phase-lock of the phase-locked loop is released since the linear speed of the spindle deviates by a large extent. That is, where the phase-locked loop is off, it is sufficient to make the cut-off frequency high.

Then, as a signal of determining whether or not this phase-lock is released, the LOCK signal produced by the above-mentioned not illustrated frame sync protection circuit is used. This signal LOCK is a signal indicating that the reproduced frame sync is correctly reproduced and is a signal which becomes low in level only when the frame sync is continuously not reproduced for a long period. The configuration is made so that one having a higher cut-off frequency is forcibly selected where the signal phase-lock is at a low level, and the cut-off frequency is selected according to the acceleration where it is at a high level.

Figure 7:
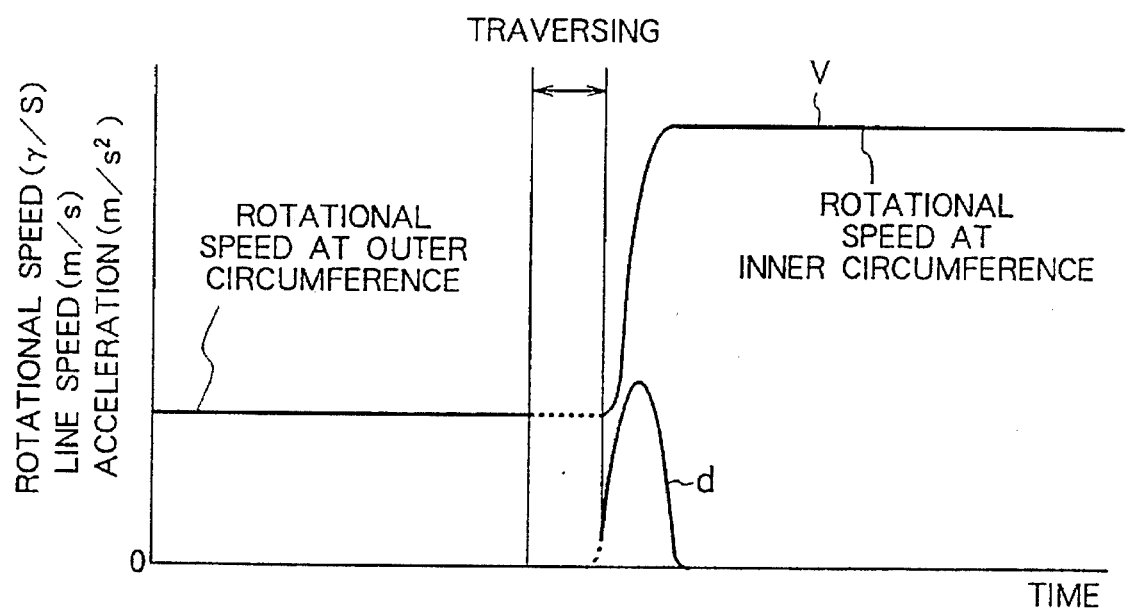
FIG. 7 is a view showing the change of the rotational speed and acceleration between before and after the traverse of the compact disc player shown in FIG. 6.
Figure 8:
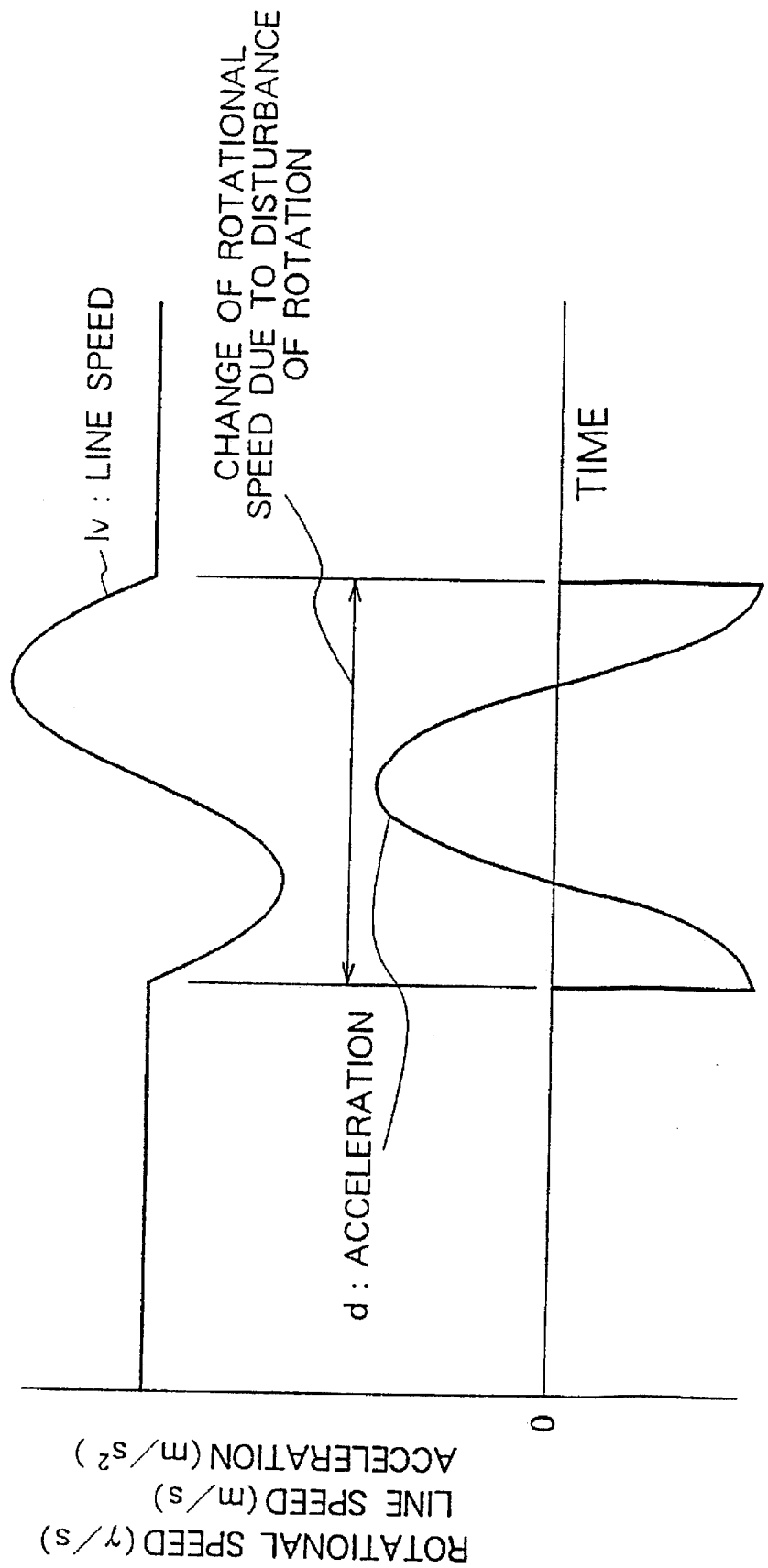
FIG. 8 is a view showing the change of the rotational speed and acceleration due to outer disturbance to the compact disc player shown in FIG. 6.

FIG. 7 and FIG. 8 are explanatory views of where the rotational speed of the spindle changes to a great extent, respectively. In FIG. 7, a case where the reproduction at the outer periphery of the disc is traversed to the reproduction of the inner periphery is shown.

In a CLV-recorded disc, the linear speed becomes constant at all positions of the disc. Therefore, the rotational speed becomes faster at the inner periphery and the rotational speed becomes slower at the outer periphery. As shown in FIG. 7, during a traverse, the eight-to-fourteen signal cannot be correctly obtained, and therefore the rotational speed becomes unstable. At the point of time when the traverse is ended and the target track of the inner periphery is reached, the eight-to-fourteen signal is correctly reproduced, and control for making the linear speed constant at that track position is carried out.

Concretely, the rotational speed is raised. When taking the time difference of the linear speed at this time, an acceleration indicated by a curve a in FIG. 7 is obtained. In this case, the traverse is instructed by the microcomputer, and it can be naturally expected that a big speed change will occur by the microcomputer.

Next, FIG. 8 is an explanation of a case where a a rotational outer disturbance is applied to the player during the reproduction. In this figure, a linear speed is indicated. For example, where the player is rotated in the same direction as the direction of rotation of the disc, the linear speed is lowered. Thereafter, so as to compensate for the insufficient amount of the data, the linear speed temporarily becomes higher than the standard speed. The acceleration in this case is indicated by a curve a in the same figure.

Figure 9:
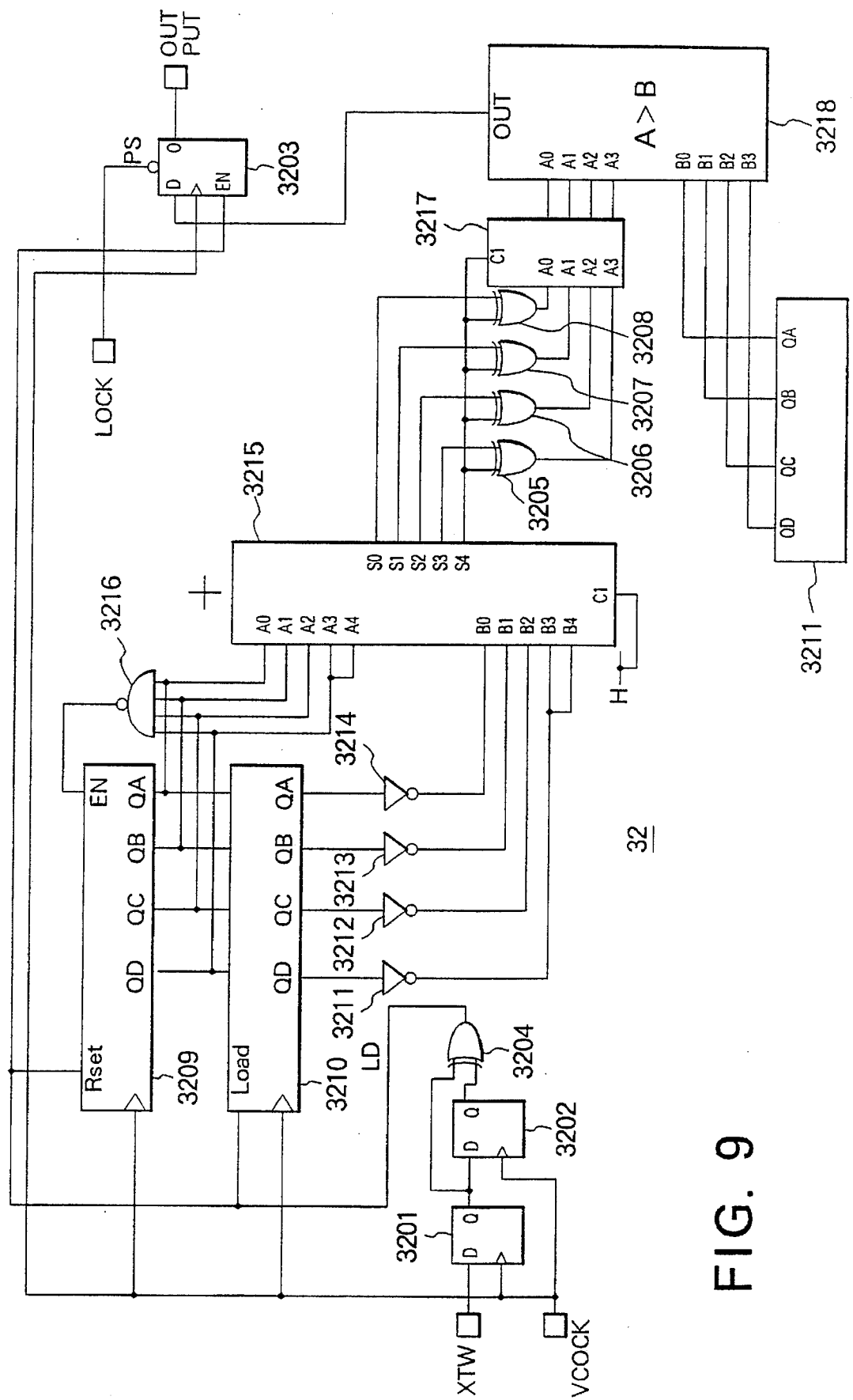
FIG. 9 is a view showing a concrete example of the configuration of an acceleration detector of the compact disc player shown in FIG. 6.
Figure 10:
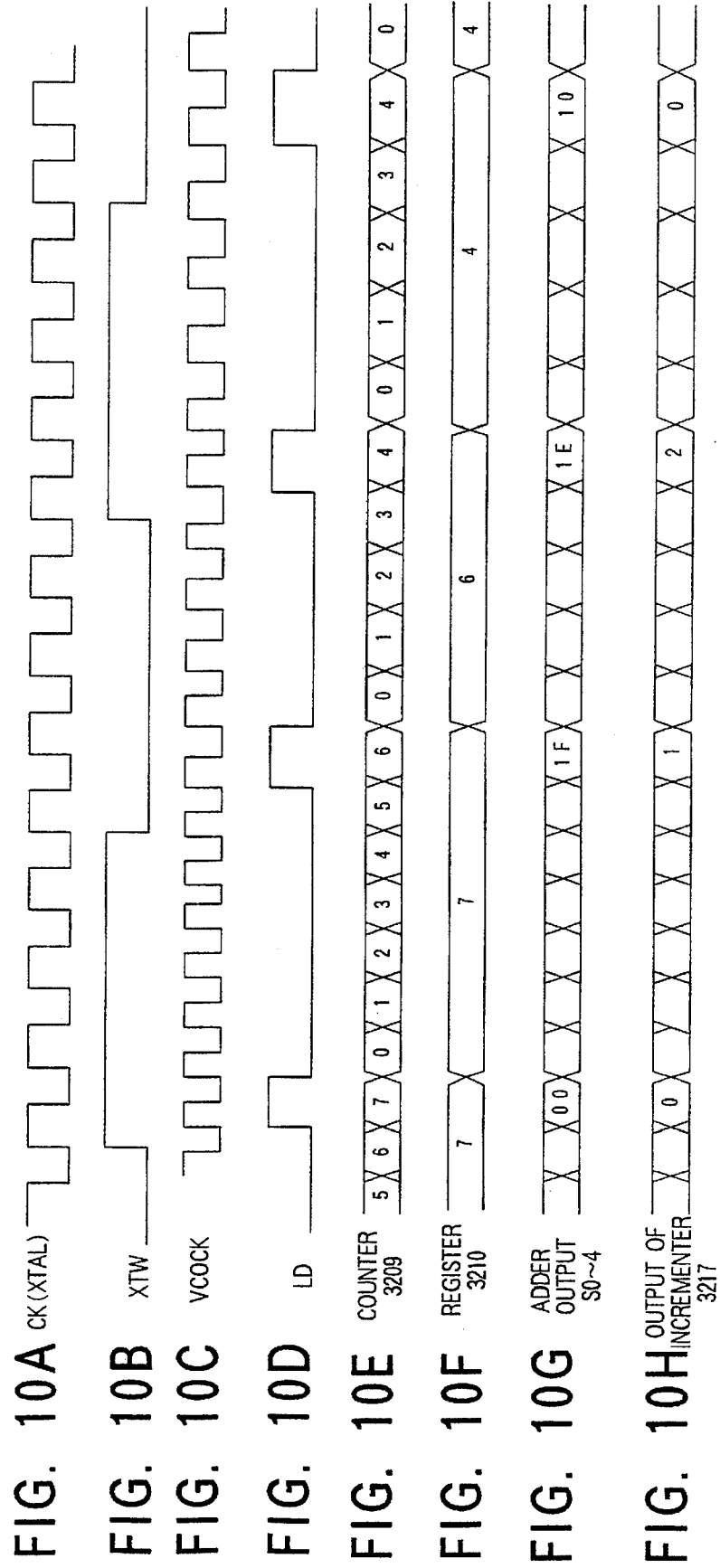
FIG. 10A to 10H are timing chart of the circuit of FIG. 9.

FIG. 9 is a block diagram showing a concrete example of the configuration of an acceleration detector 32 based on the above principle, and FIG. 10 shows a timing chart of the acceleration detector 32 of FIG. 7.

The acceleration detector 32 is constituted by flip-flops 3201 to 3203, exclusive logical OR gates 3204 to 3208, an n-bit counter 3209, n-bit registers 3210 and 3211, inverters 3211 to 3114, an adder 3215, a NAND gate 3216, an incrementer 3217, and a comparator 3218.

In such a configuration, a signal XTW obtained by dividing by L the clock signal CK produced by the crystal oscillator 26 is input to the input end D of the flip-flop 3201, and the oscillation output VCOCK of the voltage-controlled oscillator 24 is supplied as the clock input of the flip-flops 3201 to 3203 and the n-bit counter 3209 and the n-bit register 3210. In this example, the period of the signal XTW is made 8 times the period of the clock signal CK as shown in FIG. 10, but there is no particular reason for this. It is determined by the relationship with the precision.

The differentiation of the two edges of the rising and falling of this signal XTW is performed and the result thereof is supplied as an LD signal to the load (Load) terminal of the n-bit register 3210, a reset (Rset) terminal of the n-bit counter 3209, and the enable (EN) terminal of the flip-flop 3203.

Here, the signal VCOCK is a signal in proportion to the linear speed of the spindle, as mentioned above, and therefore, consequently the n-bit counter 3209 counts for how many periods the signal VCOCK exists in a section from one LD signal to the next LD signal.

In other words, the count value of the n-bit counter 3209 is in proportion to the linear speed of the spindle.

At the point of time when the n-bit counter 3209 ends the counting, that counted value is fetched into the n-bit register 3210 of the next stage.

That is, the n-bit counter 3209 and the register 3210 represent the linear speed by the time difference of $\Delta T$. Further, the outputs from the output ends QA, QB, QC, and QD of the n-bit register 3210 are inverted in level at the inverters 3211 to 3214 and respectively input to the input ends B0 to B4 of the adder 3215.

The output of the n-bit counter 3209 is added to the other input ends A0 to A5 of the adder 3215 and simultaneously incremented by 1 by the carry-in CI. Accordingly, subtraction is carried out in this circuit, and $\Delta V$ (linear speed change) is found.

Further, the output of this adder 3215 is converted to an absolute value. That is, the object of this circuit is satisfied if it is detected that the change of speed is large. Whether the acceleration is positive or negative is not regarded as the problem now.

Further, the output thereof is supplied to the input ends A0 to A3 of the magnitude comparator 3218, and the output of the register 3211 preliminarily set in the n-bit register 3211 by the controller 20a in advance is added to the other input ends B0 to B3 of the comparator 3218.

As a result of the comparison, where the acceleration (absolute value) is larger than the set value, a signal of the high level is output from the OUT terminal of the comparator 3218. This output is fetched into the flip-flop 3203 by an LD signal.

Then, when the output of the flip-flop 3203 is at a high level, this means that a force of more than the acceleration level set up the controller 20a is added. So as to follow that speed change, the cut-off frequency of the front low-pass filter 23 of the voltage-controlled oscillator 24 of FIG. 3 is made high, and conversely, when the output of the flip-flop 3203 is at a low level, such a changeover control of frequency that lowers the cut-off frequency is carried out.

In FIG. 9, the signal LOCK has been added to the preset terminal PS of the flip-flop 3203. This means that, where the signal LOCK is at a low level, the eight-to-fourteen signal is not normally taken for the reason that the traverse etc. is underway or the phase-locked loop is in the unlocked state. In any case, this means that the followability should be enhanced by raising the cut-off of the filter.

Note that, as a method of changeover to the actual frequency of the filter from the output of this flip-flop 3203, it is possible to carry out the changeover after passing through the controller such as a CPU mentioned above or the changeover is carried out by another private circuit.

Figure 11:
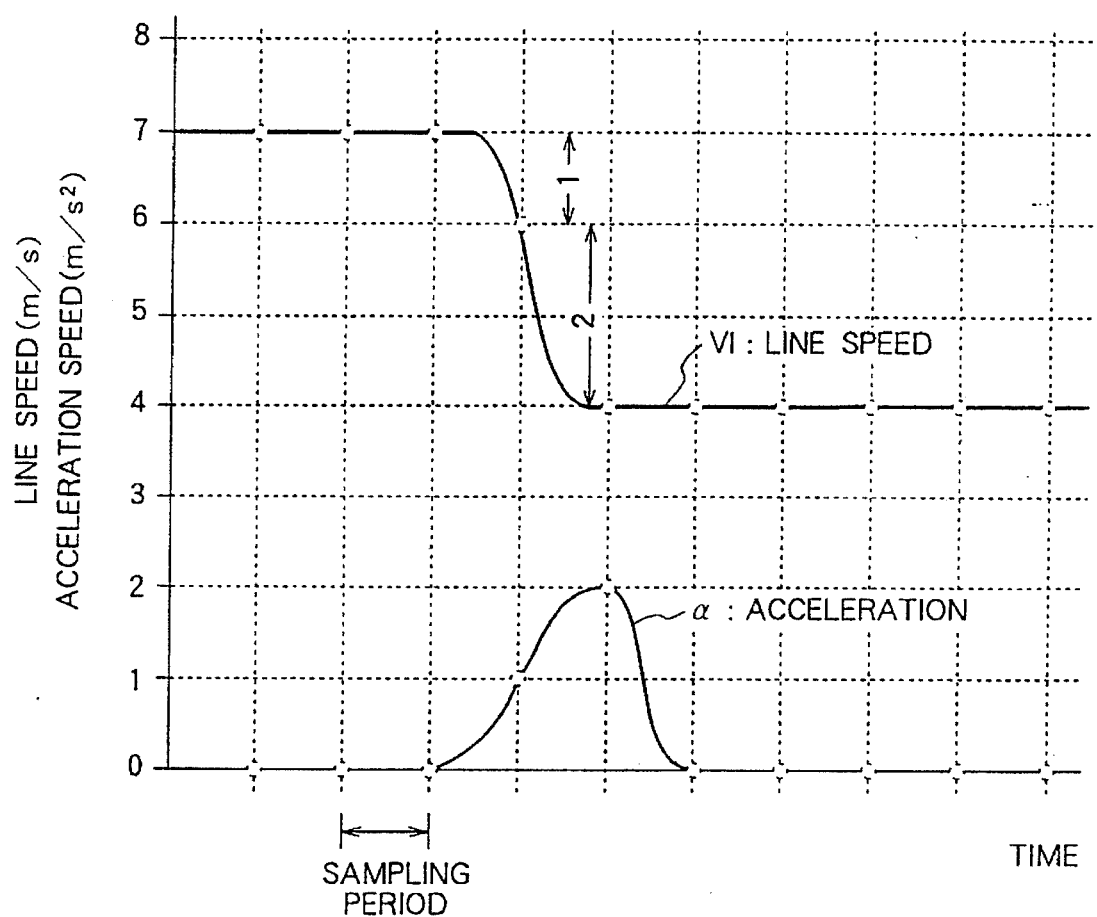
FIG. 11 is a view showing the change of the acceleration of the spindle of the compact disc player shown in FIG. 6.

Also, FIG. 11 shows an example of a case where the linear speed of the spindle at the time of operation indicated by timing charts of FIGS. 10A to 10H changes.

Also, the changeover control of the cut-off frequency of the low-pass filter based on the above-mentioned acceleration detection can be similarly applied to a phase-locked loop asymmetry correction circuit.

Figure 12:
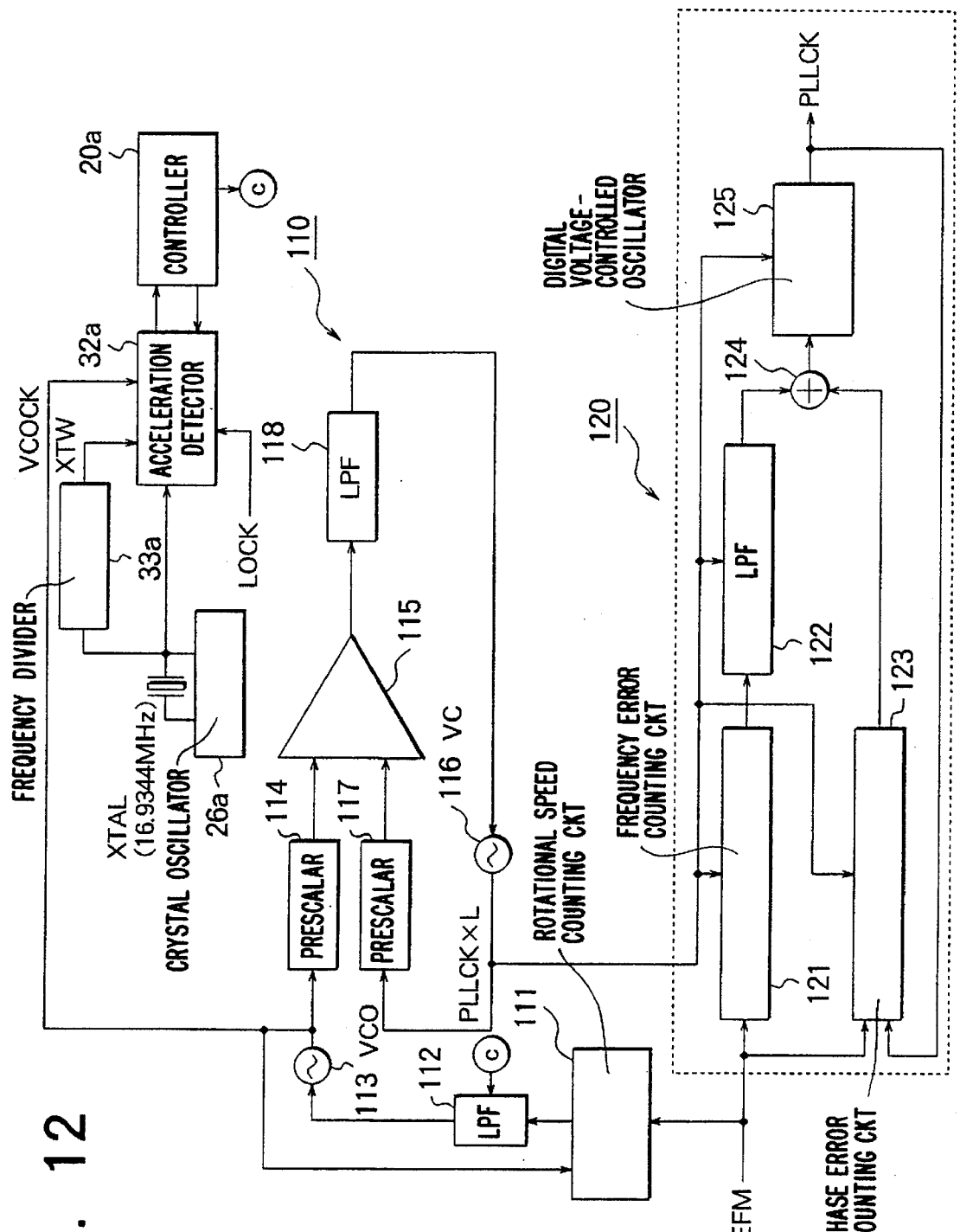
FIG. 12 is a view showing an example of the configuration of a phase-locked loop asymmetry correction circuit according to the second embodiment of the present invention.

FIG. 12 is a block diagram showing an example of the configuration of the phase-locked loop asymmetry correction circuit 11a to which the changeover control of the cut-off frequency of the low-pass filter based on this acceleration detection is applied and in which the same constituent parts as those of FIG. 4 are represented by the same references.

This circuit 11a is configured so that the oscillation output of the voltage-controlled oscillator 113 is supplied to an acceleration detector 32a having a similar configuration to that of FIG. 9 by using the oscillation output of the voltage-controlled oscillator 113 as VCOCK.

In the phase-locked loop asymmetry correction circuit 11 shown in FIG. 4, it is desired that the low-pass filter 112 of the front voltage-controlled oscillator 113 be a filter having a very low noise.

In the same way as the above description, where noise is included in this filter output, the voltage-controlled oscillator reacts with the noise potential thereof, and the CN ratio of the oscillation frequency is degraded. For this reason, also the CNR of phase-locked loop is degraded, and consequently the playability is deteriorated. For example, the error rate of the reproduced data becomes large.

So as to solve this, verification of the noise component is necessary also in this case. For this, it is necessary to lower the cut-off frequency of the low-pass filter 23 as much as possible (for example 1 Hz or less). However, where the cut-off frequency is made low, there arises a problem that when the rotational speed of the spindle 2 changes by a large extent, the change cannot be followed with an low-pass filter having a large time constant. That is, the oscillation frequency of the voltage-controlled oscillator 113 cannot change fast enough to follow the change of the rotational speed. When the frequency difference thereof exceeds the capture range of the PLL, the phase-lock of the phase-locked loop is released.

In the circuit of FIG. 4, where it can be predicted that the rotational speed of the spindle will change by a large extent, it is possible to change over the cut-off frequency of the low-pass filter 112 by control with a microcomputer, but where the change cannot be predicted, the cut-off frequency cannot be changed.

Therefore, so as to prevent release of the phase-lock in all circumstances, as shown in FIG. 12, changeover control of the cut-off frequency of the low-pass filter based on the acceleration detection is applied so that the cut-off frequency of the low-pass filter is automatically changed over and the optimum cut-off frequency with respect to the change of the rotational speed is selected.

Of course, also in this case, a slight degradation of the playability cannot be avoided, but in comparison with a case where the phase-lock of the phase-locked loop is released and it becomes impossible to read any data, this is considerably better.

The circuit of FIG. 12 is also configured based on a similar theory to that for the circuit of FIG. 6. Namely, the voltage-controlled oscillator 113 changes in its oscillation frequency in proportion to the linear speed of the spindle. That is, by counting this frequency, the linear speed can be determined. Further, if the difference of this linear speed is counted at a predetermined interval, this is a difference of speed and acceleration. Where the spindle rotates at a constant linear speed, this acceleration is generally zero.

However, where an outer disturbance occurs or a big track jump is carried out, the linear speed changes by a large extent. Where the acceleration at this time is always counted and it becomes more than a certain reference, a signal for raising the cut-off frequency of the filter is produced. By doing this, at least unlocking of the phase-locked loop can be prevented.

Also, the proportional relationship between the oscillation frequency of the voltage-controlled oscillator 113 and the spindle linear speed stands only in a case where the phase-locked loop is phase-locked. For example, where the eight-to-fourteen signal cannot be correctly obtained, for example, during a transverse, the linear speed of the spindle cannot be predicted from the oscillation frequency of the voltage-controlled oscillator. In such a case, it can be determined that the phase-lock of the phase-locked loop is released since the linear speed of the spindle deviates by a large extent.

That is, in the same way as the case of FIG. 6, where the phase-locked loop is off, it is sufficient if the cut-off frequency is made high. The same thing applies to use of the signal LOCK produced by the not illustrated frame sync protection circuit as a signal for determining whether or not this phase-lock has been released.

As explained above, according to the present second embodiment, the amount of change of the rotational speed, that is, the acceleration, is constantly counted during the reproduction, and the cut-off frequency of the low-pass filter is changed based on this. Therefore, the optimum filter cut-off frequency can be set in all reproduction states, and, consequently, there is an advantage that a high speed access can be realized.

Next, an explanation will be made of a third embodiment of the present invention.

When a rotational outer disturbance is applied to the disc player during reproduction, sometimes the rotational speed of the spindle changes by a large extent, the phase-locked loop is unlocked, and the data cannot be reproduced. At this time, there is no sound produced until the normal mode is restored.

The present third embodiment is for preventing the occurrence of such a soundless state. The acceleration is counted from the change of the spindle rotation linear speed to detect the outer disturbance. The reproduction mode is changed over based on the result thereof, thereby to prevent the soundless state.

Namely, in the present third embodiment, by performing changeover control of the changeover switch based on the result of the detection of the acceleration, the occurrence of the above-described soundless state is prevented and that state is restored early.

The circuit configuration is equivalent to that of FIG. 6. The control with respect to the changeover switch 25 of the control circuit 20a is different. Accordingly, here, an explanation of the concrete circuit configuration will be omitted.

Below, a further detailed explanation will be made of circumstances reaching the third embodiment, and a concrete structure and function while referring to the drawings.

As in the circuit of FIG. 4, in a circuit making the entire reproduction signal processing circuit follow the rotational speed of the spindle, when the rotational speed changes, the pitch of the music which is reproduced also changes. No matter what the rotational speed is, data can be continuously reproduced (hereinafter, this is referred to as a mode A).

Also, as in the circuits of FIG. 3 and FIG. 5, in the mode using the circuit provided with a phase-locked loop having a wide capture range following the rotational speed of the spindle 2 (hereinafter, referred to as a mode B), the reproduced data rates become constant and no so-called "wow" is caused in the music, but the memory of the time based correction (TBC) easily causes over/underflow and continuous reproduction is difficult.

In a general compact disc player, when the player is rotated along the rotational direction of the disc during the reproduction, the relative linear speed with respect to the player changes by a large extent, the frequency spectrum of the eight-to-fourteen signal is shifted, and the phase-locked loop falls into an unlocked state, whereby becomes impossible to reproduce the data.

Contrary to this, in the circuit of FIG. 3, the capture range could be greatly enlarged, but "wow and flutter" always exists in the mode A. This is not suitable for the reproduction from a music disc. Note that, in the case of an ESP player, the "wow" is time-based corrected (TBC), and therefore there is no problem.

Also, in the mode B, the capture range is wide, and "wow" does not occur either, but the memory used for both of the de-interleave and the time-based correction has a small capacity and is apt to suffer from an overflow and underflow. If this occurs, the music cannot be continuously reproduced.

When this memory capacity is made larger, the memory becomes resistant to overflow or underflow, but the configuration of this becomes almost the same as that of the ESP, and the cost of the LSI is increased. For the above reasons, in any of the mode A and mode B, there is no effective method of utilization enhancing the anti-rolling performances in a music reproduction player other than the ESP "Discman" and CDROM, and therefore the third embodiment of the present invention has been configured.

Before an explanation of the present embodiment, the linear speed, acceleration, and amount of frame shift will be explained while referring to FIG. 13 to FIG. 15.

Figure 13:
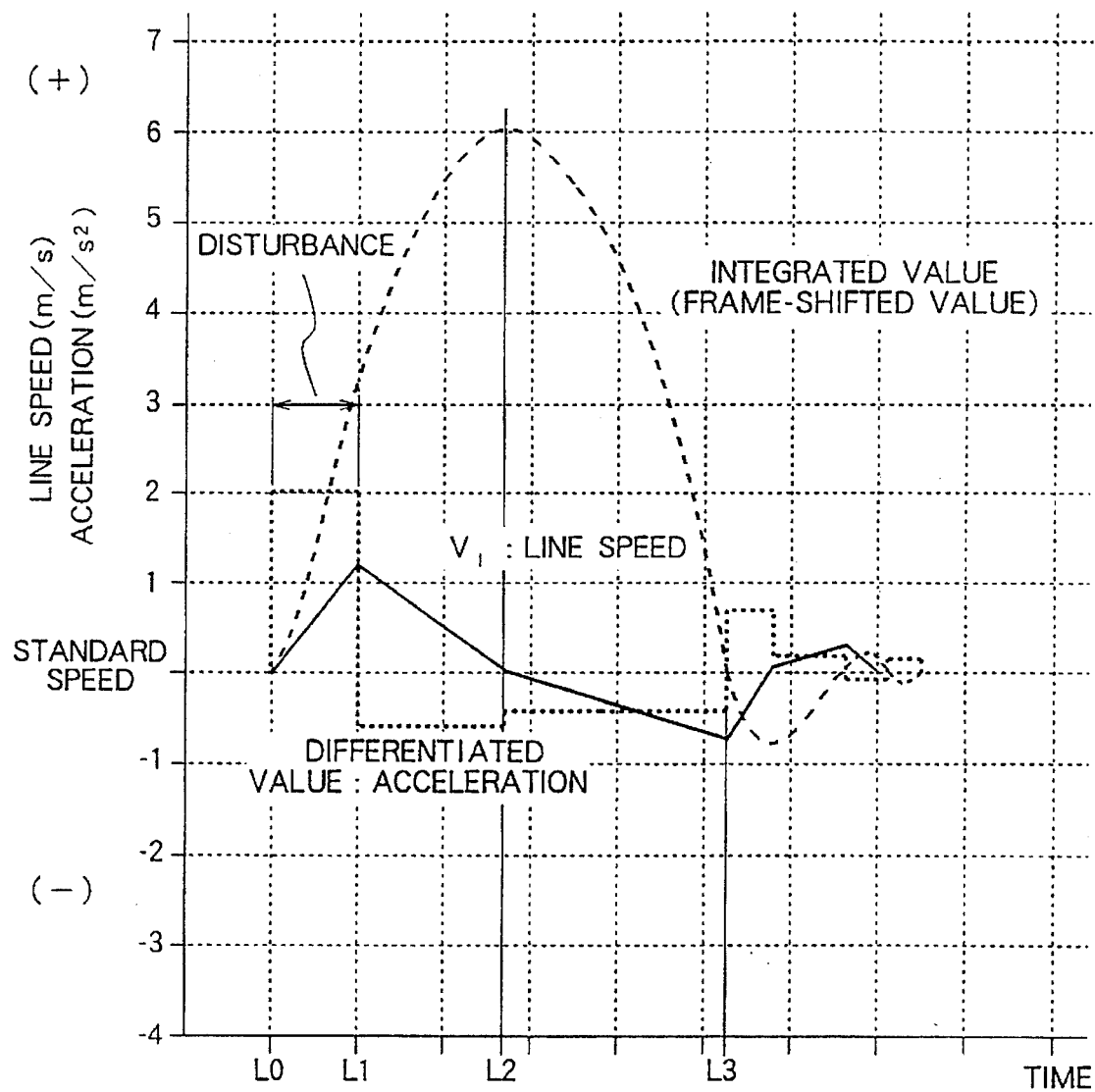
FIG. 13 is a view showing a relationship between the change of the linear speed of the spindle and acceleration due to outer disturbance for explaining a third embodiment of the present invention.

FIG. 13 shows the relationship between the change of the linear speed of the spindle due to the outer disturbance and acceleration. In the case of this FIG. 13, the spindle rotates at a standard linear speed before the time t0, and a constant force (acceleration) of outer disturbance is applied there for a term of from t0 to t1. After the time t1, the outer disturbance disappears, and a control is carried out so that the spindle servo system recovers to the stable point. This stable point is not controlled so as to become a target linear speed, but is controlled so that the frame jitter margin of the TBC RAM becomes maximum.

That is, in a compact disc, the RAM is used and the time-based correction is carried out so as to correct the "wow and flutter" of the spindle 2. If the rotational speed of the spindle becomes faster, the data in the TBC RAM is increased, while it the opposite case it is decreased.

In these cases, a certain limit (frame jitter margin) is exceeded, the TBC RAM suffers from overflow/underflow. The servo control is carried out so that this margin becomes the maximum with respect to the increase or decrease of the data.

By assuming that a constant force is applied for a term of from t0 to t1, the actual linear speed is linearly increased. Even if the outer disturbance disappears at the time t1, in FIG. 13, a minus force is applied thereafter up to the time t3. This force is automatically controlled by the servo system of the system. That is, as mentioned before, it is the result of the rotation control so that the frame jitter margin becomes maximum.

Explaining this again, the linear speed rises due to the outer disturbance of t0 to t1, and the linear speed has become the maximum at t1. Thereafter, so as to lower the linear speed, a force on the inverse side is generated from the control system. Due to that force, the linear speed is decreased, and the linear speed is returned to the standard speed at the point of time of t2.

However, the linear speed continues to decrease even thereafter and becomes the standard speed or less. The reason for this is that the data reproduced for a term of from t0 to t2 is faster than the standard speed and therefore is continuously increased in the TBC RAM by that amount and consequently remains on the RAM in proportion to the integrated value of this linear speed. The data of the amount of this increase decreases the frame jitter margin on the RAM. Therefore, the servo system further continues the deceleration control even after the time t2 and controls the speed to minus from the standard linear speed. Then, it decreases the data on the RAM and continues the control so as to make the frame jitter margin the maximum. In the end, the frame jitter margin on the RAM becomes the maximum at the point of time of t3, and the system is stabilized.

Figure 14:
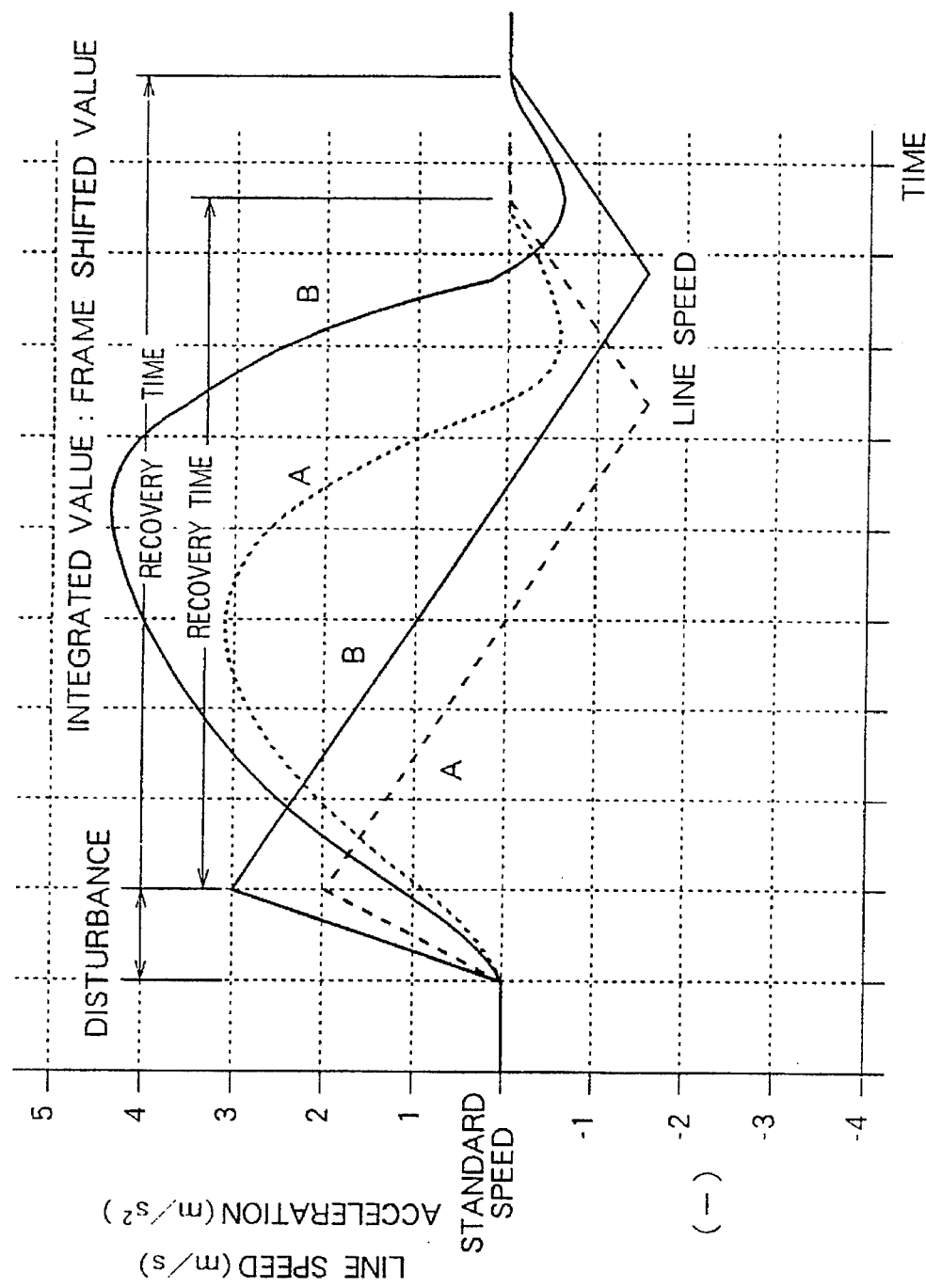
FIG. 14 is a view showing the change of the linear speed of the spindle at the time of application of a constant servo gain and different outer disturbances for explaining the third embodiment of the present invention.

FIG. 14 is a view showing the change of the spindle linear speed at the time of the application of different outer disturbances and a constant servo gain and shows the same until the system is stabilized where the intensity of the outer disturbance is different. It is assumed that both of the case of A and the case of B indicated in the figure have the same servo gain.

As seen from this FIG. 14, the strong outer disturbance B has a larger integrated value than the weak outer disturbance A. Of course, if a strong outer disturbance is applied and the frame jitter margin exceeds the integrated value, an overflow of the RAM occurs. Conversely, this means that the overflow of the RAM can be predicted from the magnitude of the outer disturbance (acceleration).

Figure 15:
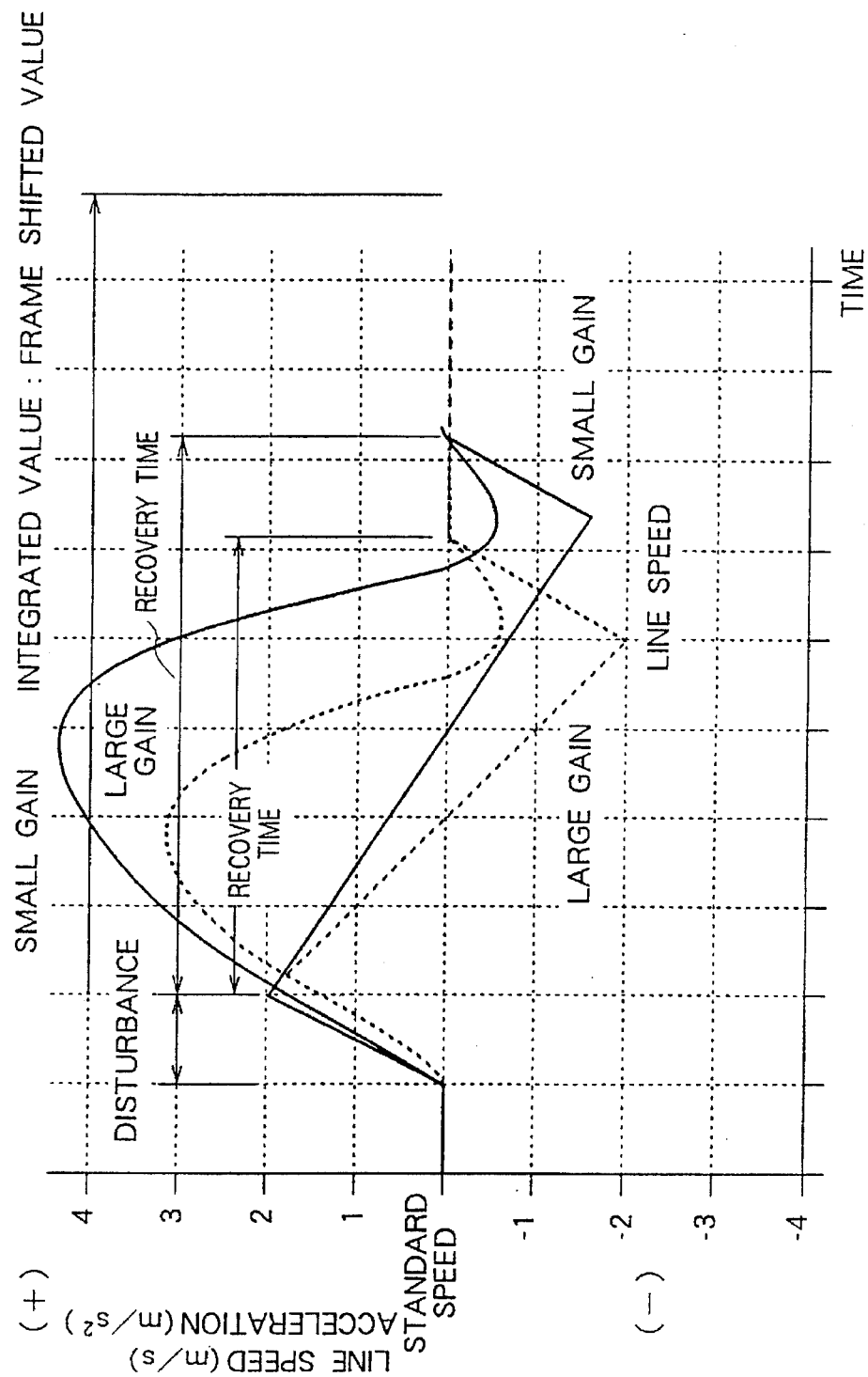
FIG. 15 is a view showing the change of the linear speed change of the spindle due to an outer disturbance at the time of application of the same outer disturbances and different servo gains for explaining the third embodiment of the present invention.

Also, FIG. 15 is a view showing the change of the spindle linear speed due to outer disturbance in a case where the outer disturbance having the same magnitude is added and the servo gain is made different.

As seen from this FIG. 15, if the outer disturbance is the same, a larger gain results in a shorter time until the stabilization of the system. For the integrated value as well, a larger gain results in a smaller amount of frame shift.

However, the gain optimum for the servo control system in the usual state is different from the gain of this case. That is, it is necessary that the phase margin of the servo control system and the gain margin can be sufficiently established in the servo bandwidth. In the end, the gain is changed only when an outer disturbance is applied and it is attempted to shorten the time of recovery.

In any case, by detecting the acceleration, the gain is changed and the influence of the outer disturbance can be minimized.

In the present third embodiment, the intensity of the outer disturbance is found by counting the acceleration. In a state where there is no outer disturbance, the player is played by the aforementioned mode B. Where an outer disturbance is applied, if the magnitude thereof is weak enough that it does not cause an overflow of the RAM, the servo gain is merely enlarged, and the recovery is made early. On the other hand, in a case where a strong outer disturbance causing the overflow of the RAM is applied, the servo gain is enlarged, and further the reproduction mode is switched to the aforementioned mode A. Although the pitch changes for an instant, the system is protected from a serious situation where the overflow of the RAM is caused, noise is included in the music, or the music is stopped.

The most important matter in this is the switching of the reproduction mode from the mode B to the mode A due to the application of an outer disturbance of a certain intensity or more. The changeover of the gain is not so important.

In the concrete circuit equivalent to that of FIG. 6, where the changeover switch 25 is connected to the output side of the crystal oscillator 26, the reproduction mode becomes B, and where it is connected to the output side of the voltage-controlled oscillator 24, the reproduction mode becomes A. Moreover, the configuration of the acceleration detector 32 is similar to that of the circuit of FIG. 9, and the output of the acceleration detector 32 is constantly monitored by the controller 20a.

For example, where an outer disturbance stronger than the acceleration which was preliminarily set is applied, the acceleration detector 32 outputs a high level signal to the controller 20a. Then, if this high level output is continued for a predetermined time, first the servo gain is raised. If the output of the high level is still continued even if a certain predetermined time elapses, control is exercised so that the reproduction mode is switched to A.

Due to this, an enhancement of the anti-rolling performance for the "Discman" can be achieved for a wide capture mode of the mode A and mode B, and further control becomes possible so as to restore the normal situation in an early stage.

That is, when no force has been applied to the spindle rotation control system, the music is reproduced in the mode B, and where a certain force is applied and there is a possibility that the memory will suffer from over/underflow, the reproduction mode is switched to A. As a result, reproduction of music without "wow" can be carried out in a state free from outer disturbance. Only in a case where a strong outer disturbance is applied, the reproduction mode is switched to A, and the music can be continuously reproduced. Of course, in that case, the pitch of the sound shifts for an instant, but in comparison with a case where the music stops completely, the former is considerably better. Also, if the outer disturbance is detected, the system can be changed over to the servo characteristic most suited to it.

As explained above, according to the present invention, a configuration is adopted wherein a voltage-controlled oscillator is used as a means giving the reference frequency to the first phase-locked loop circuit (analog phase-locked loop circuit), a control voltage in accordance with the speed error with respect to the reference speed of the rotational speed of the spindle is given to this voltage-controlled oscillator, the reference clock is produced by the first phase-locked loop circuit based on the oscillation frequency given by this voltage-controlled oscillator, and, at the same time, the reproduction clock is produced at the second phase-locked loop circuit (digital phase-locked loop circuit) based on this reference clock, whereby the oscillation frequency changes in proportion to the rotational speed of the spindle in both of the above-described voltage-controlled oscillator and the voltage-controlled oscillator in the first phase-locked loop circuit, and therefore a phase-locked loop circuit having a very wide capture/phase-lock range can be realized as a whole.

As a result, for example when the disc player is used outdoors, even in a case where the rotational speed of the spindle deviates by a large amount with respect to the target value, for example, a case where the player unit is rotated in the direction of rotation or a direction opposite to the direction of rotation of the disc, a case where a large track jump occurs at the time of access, etc., the phase-lock of the phase-locked loop is almost never released, and therefore the data can be always read and, at the same time, high speed access becomes possible. In other words, this means that there is no problem even if the spindle servo control is relatively loose and means also that the servo gain can be lowered. Accordingly, it becomes possible to keep the power consumption of the spindle servo control system low.

Also, by constantly counting the amount of change of the rotational speed, that is, the acceleration during the reproduction, the cut-off frequency of the filter is changed, and therefore the optimum cut-off frequency can be set in all reproduction states. Consequently, there is an advantage that high speed access can be realized.

Further, an enhancement of the anti-rolling performance of the "Discman" etc. can be achieved with the wide capture mode of the mode A and mode B, and further that situation can be restored at early time, and the music can be continuously reproduced even if a strong outer disturbance is applied.

What is claimed is:

1. A signal processing circuit of a disc reproduction apparatus which produces a reproduction clock in synchronization with a signal reproduced from a disc and performs signal processing with respect to said reproduced signal based on said reproduction clock, comprising:

a rotational speed counting means for detecting a rotational speed of a spindle based on said reproduced signal and producing a speed error as a control signal in accordance with the detected rotational speed and a reference speed;

an oscillation means whose oscillation frequency changes in accordance with said control signal;

a first phase-locked loop circuit which produces a reference clock of a predetermined frequency based on the oscillation frequency of said oscillation means; and a second phase-locked loop circuit which produces said reproduction clock based on said reference clock, detects a frequency error and a phase error of said reproduced signal with respect to said reproduction clock, and controls a frequency and a phase of said reproduction clock based on that frequency error and phase error.

2. A disc reproduction apparatus as set forth in claim 1, wherein said rotational speed counting means has a first detection means for detecting a speed difference of the rotational speed of the spindle with respect to the reference speed; a second detection means for detecting a cycle difference of the cycle of said reproduced signal with respect to a reference cycle; and a changeover means for outputting the speed difference detected by said first detection means as said control signal and then outputting the cycle difference detected by said second detection means as said control signal.

3. A disc reproduction apparatus which produces a reproduction clock in synchronization with a signal reproduced from a disc and performs a signal processing with respect to said reproduced signal based on said reproduction clock, comprising:

a rotational speed counting means for detecting a rotational speed of a spindle based on said reproduced signal and producing a speed error as a control signal in accordance with the rotational speed of the spindle and a reference speed;

a filter means whose cut-off frequency is variable in accordance with a changeover control signal and which extracts only a predetermined frequency range of said control signal by a related cut-off frequency and outputs the same;

an oscillation means whose oscillation frequency changes in accordance with a control signal output from said filter means;

a first phase-locked loop circuit which produces a reference oscillation clock of a predetermined frequency based on the oscillation frequency of said oscillation means;

a second phase-locked loop circuit which produces said reproduction clock based on said reference oscillation clock, detects a frequency error and a phase error of said reproduced signal with respect to said reproduction clock, and controls a frequency and a phase of said reproduction clock based on that frequency error and phase error;

an acceleration detection means for receiving said oscillation output and reference clock and detecting roll acceleration; and a control means for outputting said changeover control signal in accordance with a result of a comparison between said detected acceleration and a preliminarily set acceleration to said filter means.

4. a disc reproduction apparatus as set forth in claim 3, wherein said rotational speed counting means has a first detection means for detecting a speed difference of the rotational speed of the spindle with respect to the reference speed; a second detection means for detecting a cycle difference of a period of said reproduced signal with respect to a reference period; and a changeover means for outputting speed difference detected by said first detection means as said control signal and then outputting the period difference detected by said second detection means as said control signal.

5. A disc reproduction apparatus as set forth in claim 3, wherein said first phase-locked loop circuit has a first frequency division means for dividing said oscillation output with a variable frequency division ratio; a second frequency division means for dividing said reference oscillation clock with a variable frequency division ratio; and a phase comparison means for detecting a phase difference of the respective divided outputs of said first and second frequency division means.

6. A disc reproduction apparatus as set forth in claim 3, wherein said acceleration detection means has a cycle counting means which counts the cycle of the oscillation output of said oscillation means in said reference clock; a speed change calculation means for finding the speed change based on the result of counting of said cycle counting means; and a comparison means for comparing the magnitude of the speed change with the preliminarily set value and outputs the result thereof to said control means.

7. A disc reproduction apparatus as set forth in claim 3, wherein said control means produces said changeover control signal which raises the cut-off frequency of said filter means where the detected acceleration is larger than the set acceleration and lowers the cut-off frequency of said filter means where the detected acceleration is smaller than the set acceleration.

* * * * *